United States Patent [19]

Moriyama

[11] 4,042,291

[45] Aug. 16, 1977

[54] PIPE CONNECTING APPARATUS

[75] Inventor: Hideo Moriyama, Tokyo, Japan

[73] Assignee: Moriyama Sangyo Kabushiki Kaisha, Tokyo, Japan

[21] Appl. No.: 538,263

[22] Filed: Jan. 3, 1975

[30] Foreign Application Priority Data

Feb. 2, 1974 Japan .................................. 49-13917
Mar. 6, 1974 Japan .................................. 49-25148
Mar. 14, 1974 Japan .................................. 49-28502
Apr. 10, 1974 Japan .................................. 49-39889

[51] Int. Cl.² ......................................... H01R 13/54
[52] U.S. Cl. .................................. 339/89 M; 285/129; 285/DIG. 8; 339/122 R
[58] Field of Search ............... 339/89 R, 89 C, 89 M, 339/92 R, 92 M, 122 R; 285/DIG. 8, 128, 129, 158, 163

[56] References Cited

U.S. PATENT DOCUMENTS

| 1,233,188 | 7/1917 | Coggeshall | 339/89 R |
| 1,255,264 | 2/1918 | Wright | 339/89 R |
| 2,755,331 | 7/1956 | Melcher | 339/89 C |
| 2,826,436 | 3/1958 | Hupp | 285/158 |
| 3,775,828 | 12/1973 | Kopenhaver | 339/89 R |

Primary Examiner—Roy Lake
Assistant Examiner—Mark S. Bicks
Attorney, Agent, or Firm—Oblon, Fisher, Spivak, McClelland, & Maier

[57] ABSTRACT

A pipe connecting apparatus of a multiple structure is adapted to contain electrical wiring for illumination facilities therein. The pipe connecting apparatus comprises a combination of (a) a connecting body of a polyhedral structure adapted to contain an electrical connecting means therein and serving as a branch base of the multiple piping, (b) at least two projecting pipes mounted in the connecting sides of said connecting body, (c) a communication pipe to be coupled with said projecting pipe, and (d) a sleeve for the coupling and fixing the projecting pipe to said communication pipe.

12 Claims, 82 Drawing Figures

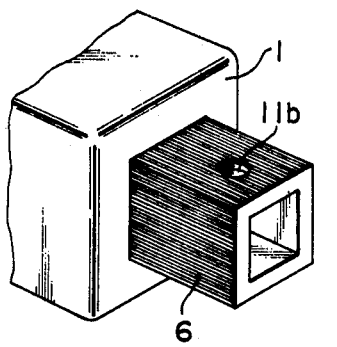
FIG. 10a
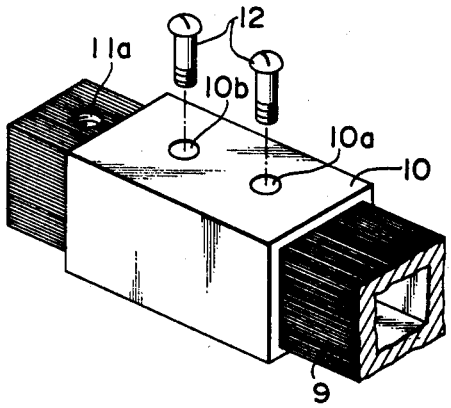
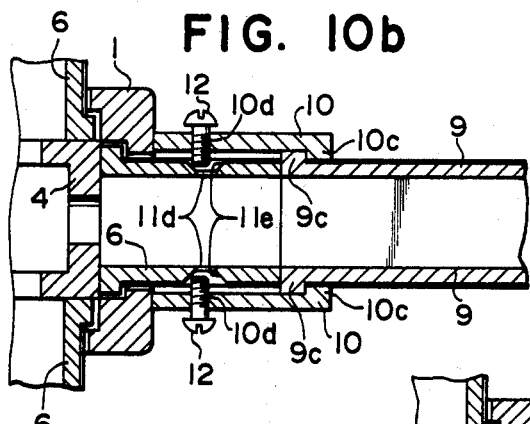
FIG. 10b
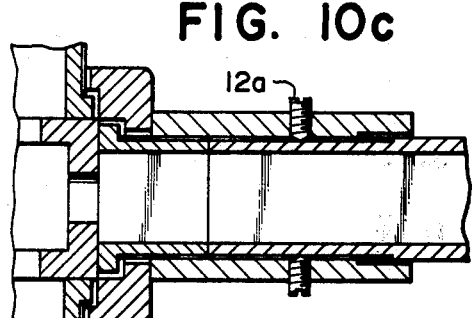
FIG. 10c
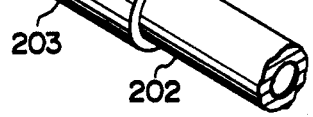
FIG. 10d

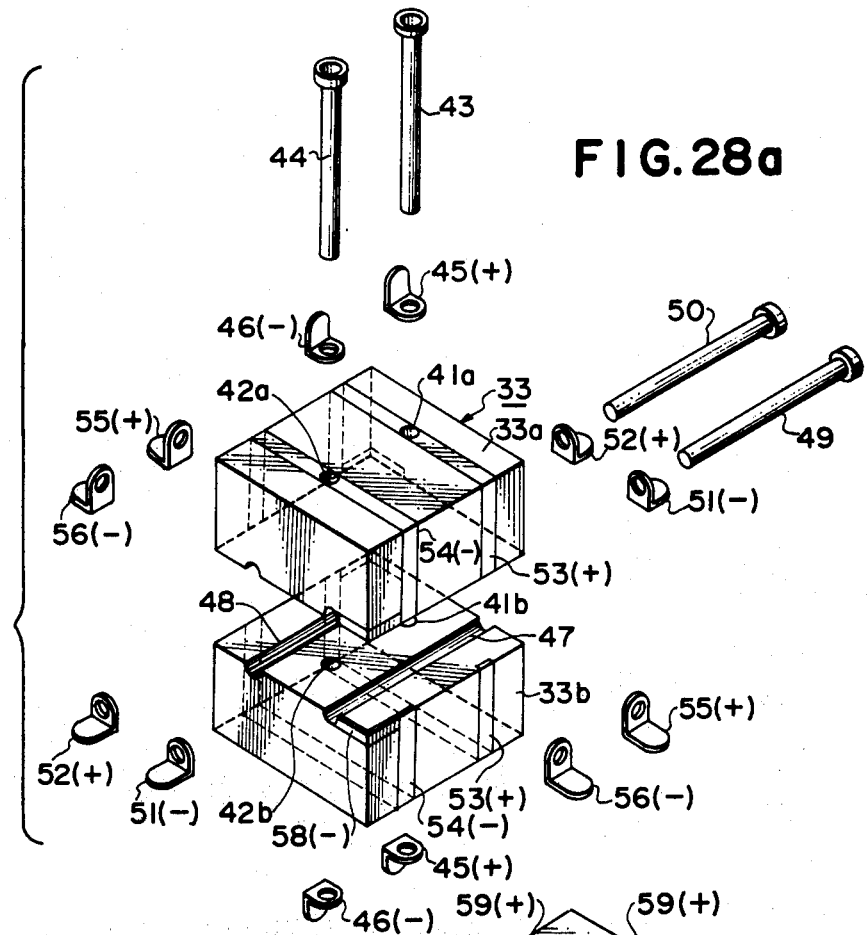
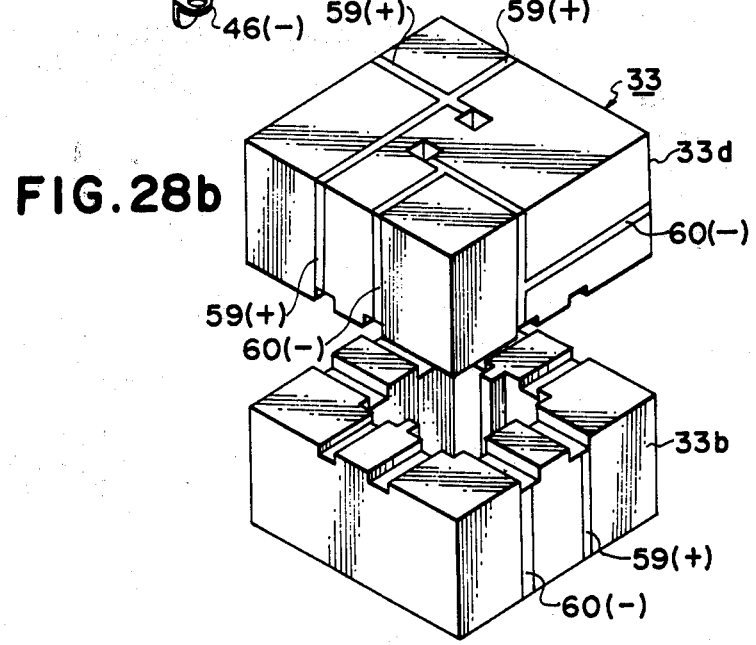

PIPE CONNECTING APPARATUS

This invention relates to a pipe connecting apparatus for piping of electrical wiring. More particularly, it is concerned with a pipe connecting apparatus suitable for constructing a lighting structure of a three-dimensional, manifold structure. Also, it relates to a pipe connecting apparatus which is adapted for use in piping facilities for feeding all kinds of fluids such as, for example, water, vapor, oil, gas, and chemicals and also adapted to construct, by utilization of its structure for connection, three-dimensional pipe structures such as a showcase and stand for commodities.

There has heretofore been known a piping pipe connector having a connecting end for four or less branches of a planar construction in biaxial directions perpendicularly intersecting each other, and a piping pipe connector having a connecting end for six or less branches of a three-dimensional construction in triaxial directions perpendicularly intersecting one another. However, each connecting end in such kinds of apparatus has its end portions, including base, formed integrally with one another. As a result, in case there is an error in mounting or in the size of the piping members to be connected to such connecting end, the latter end and the piping members had to be bent or curved to attain their connection, so that the assembling was not easily accomplished and forced assembling resulted in stress of the piping members and for this reason the durability was reduced. In addition, the connecting ends in such conventional apparatus are connected to connecting materials as male or female connecting members, so that in the connection it was necessary that plural portions of the piping structure of every block assembled in a certain manner should be connected at one time; in this case, however, the mounting operation for a multiplicity of connecting portions between blocks must be done in a simultaneous manner and, also in the operation for disconnection, a multiplicity of connected portions must be disconnected at a time as in the assembling operation so that the portions of piping structure in each block are maintained in an integral manner. In such conventional apparatus, accordingly, removal of only one piping material is attended with difficult operations such as the need for causing the pipe to be curved.

From the standpoint of piping facilities, what are of good marketability are those piping connectors which are easy to be connected and disconnected and which are of such a construction as to satisfy the desired originality and individuality, as an appliance such as, for the lighting purpose, an optional change in structure and an increase or decrease in the number of lighting bulbs. This is also the case with shelf positions to be increased or decreased when applying the apparatus to, for example, a show-case for commodities.

This invention has been developed with a view to providing such an apparatus as to satisfy any requirements of such facilities.

It is an object of the invention to provide a connecting apparatus adapted to effect an easy, positive connection, in which an error, if any, in mounting or in size of the piping member to be connected can be tolerated.

The second object of the invention is to provide a connecting apparatus for piping whereby, in a three-dimensional piping, each individual piping material can easily be connected for the assembling in a separate manner and, after connection, connected pipes can be partly disconnected with ease one by one.

The third object of the invention is to provide a connecting apparatus for piping having projecting pipes which project not only in biaxial or triaxial directions perpendicularly intersecting each other, but also in directions inclined relative to such intersecting axial directions.

The fourth object of the invention is to provide a connecting apparatus for piping which facilitates a multiple piping by being integrally connected in plural numbers.

The fifth object of the invention is to provide a connecting apparatus for piping capable of being connected to, in lieu of piping members, accessories such as illumination lights, consents, switches, and hangers.

The sixth object of the invention is to provide the above-mentioned connecting apparatus for piping capable of effecting the connection of piping members within which an electrical wiring has been applied.

Other and further objects of the invention will become clear from the following illustrative embodiments.

Figure 3A:
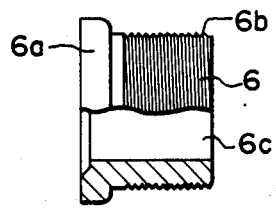
Figure 3B:
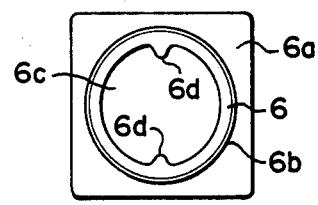
Figure 3C:
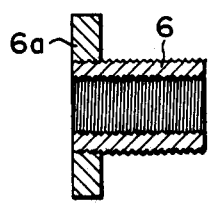
Figure 3D:
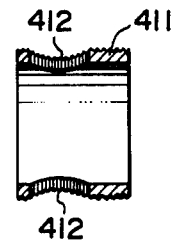
Figure 3E:
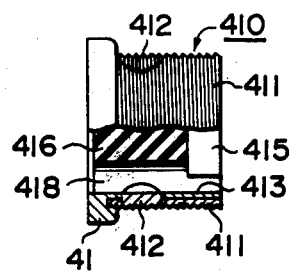
Figure 3F:
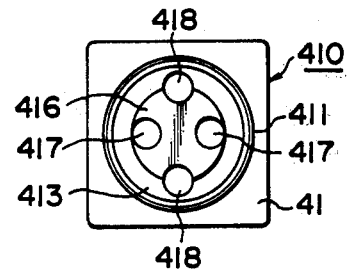
Figure 3G:
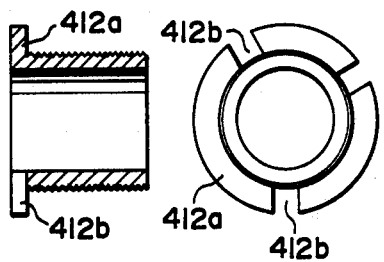

FIGS. 3a to 3g illustrate a projecting pipe as the connecting end in the apparatus of the invention, FIG. 3a being a partly longitudinal side section, FIG. 3b a front view, FIG. 3c a longitudinal side section illustrating another embodiment, FIGS. 3d and 3g longitudinal sections and front views of threaded metal portions of the projecting pipe, FIG. 3e a partly sectional view of the projecting pipe using the metal portion shown in FIG. 3d, and FIG. 3f a front view of FIG. 3e.

Figure 4:
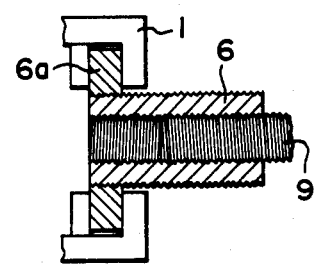

FIG. 4 is a longitudinal side section showing a working embodiment of the projecting pipe illustrated in FIG. 3c.

Figure 5:
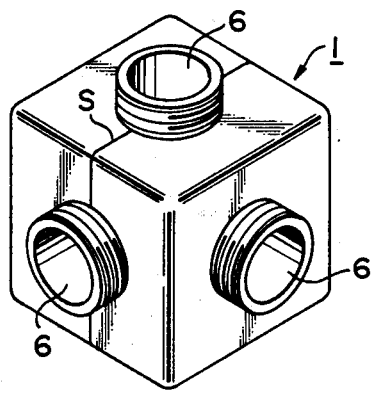
Figure 7:
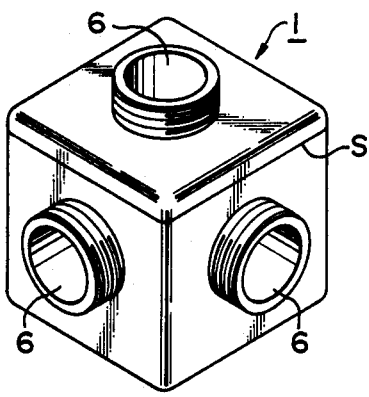

FIGS. 5 and 7 are perspective views illustrating working embodiments of the connecting body in the invention.

Figure 8:
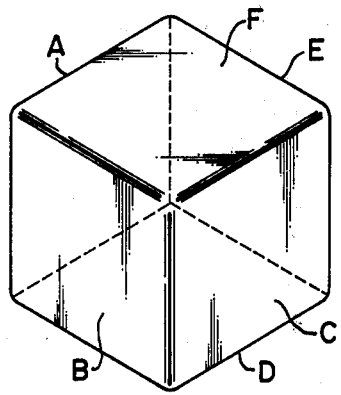

FIG. 8 is a view explaining the kind of the said working embodiments.

Figure 9A:
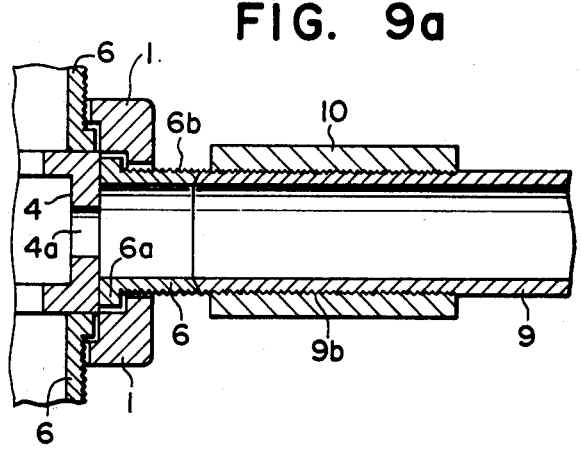
Figure 9B:
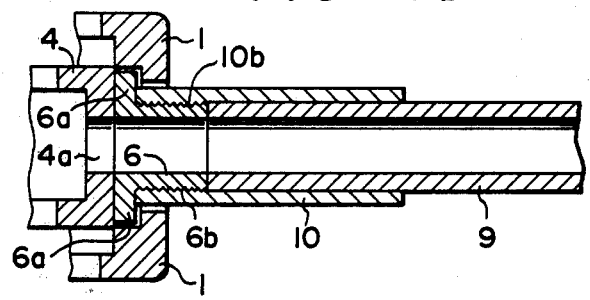
Figure 9C:
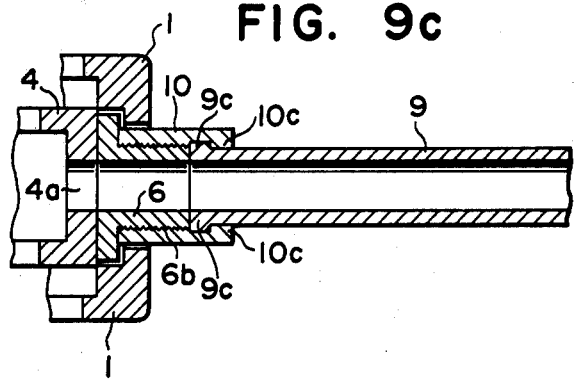

FIGS. 9a to 9c are longitudinal side sections illustrating working embodiments of the principal parts of the apparatus of the invention.

FIGS. 9d to 9g are longitudinal sections illustrating other working embodiments.

Figure 10E:
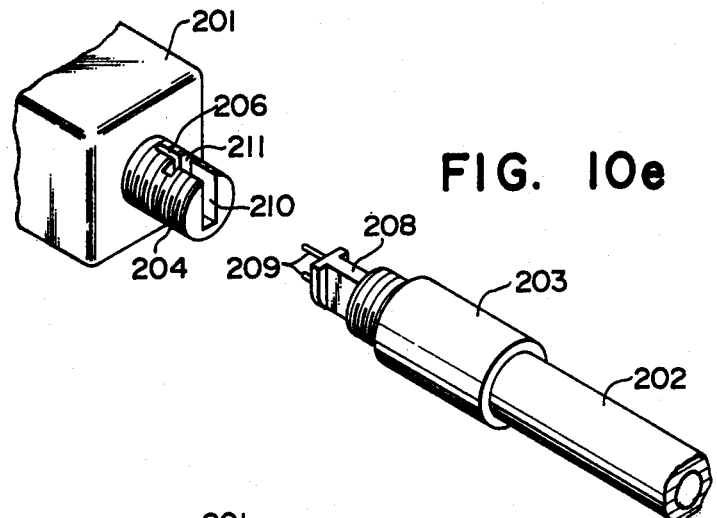

FIGS. 10a to 10j illustrate other working embodiments of the apparatus of the invention, FIG. 10a being a partly disconnected perspective view, FIG. 10b a longitudinal section of the principal parts in another embodiment, FIG. 10c a longitudinal section of the principal parts in a still further embodiment, and FIGS. 10d to FIG. 10j are perspective views of the principal parts in other embodiments.

Figure 11:
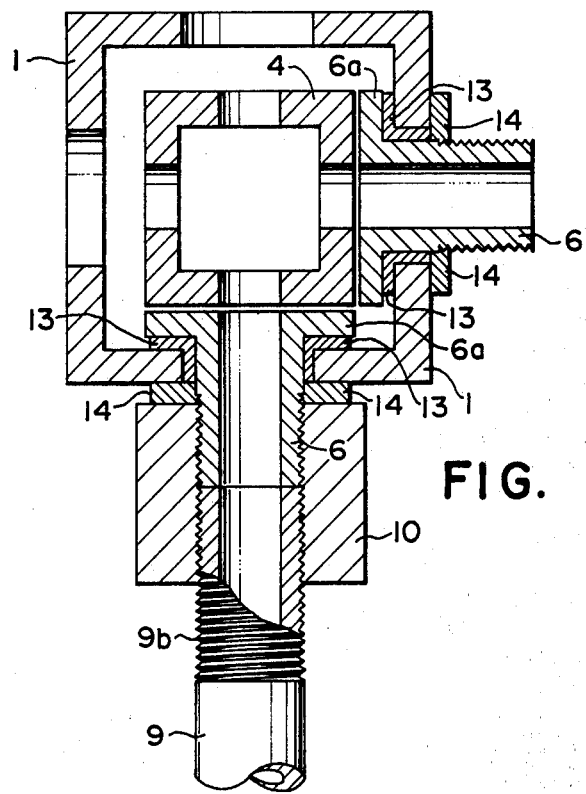

FIG. 11 is a partly schematic longitudinal section showing another embodiment of the apparatus of the invention.

Figure 12:
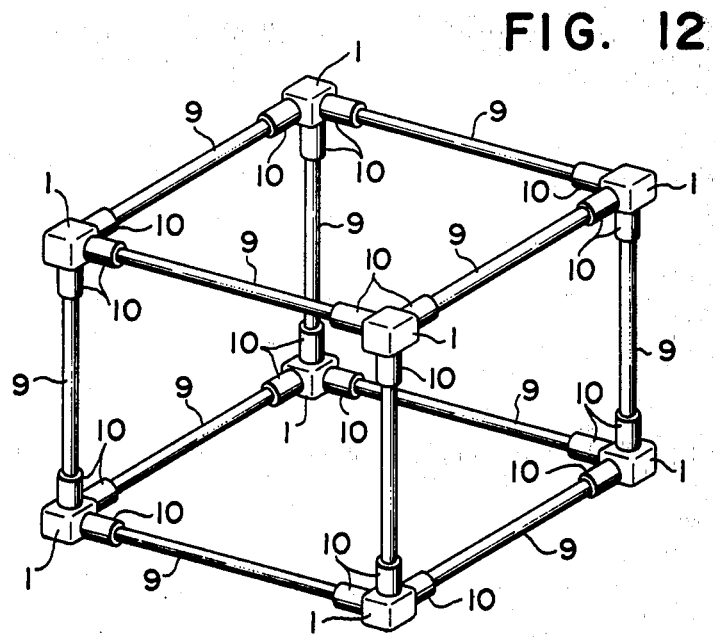

FIG. 12 is an oblique view showing a basic embodiment of the apparatus of the invention.

FIGS. 13a to 13h are views explaining members as an accessory of the apparatus of the invention.

Figure 14:
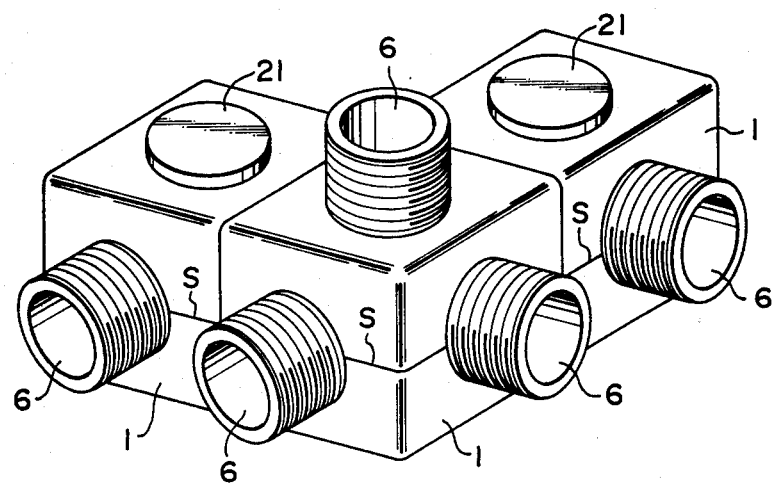

FIG. 14 is a perspective view showing an embodiment of multiple piping of the apparatus of the invention.

Figure 15:
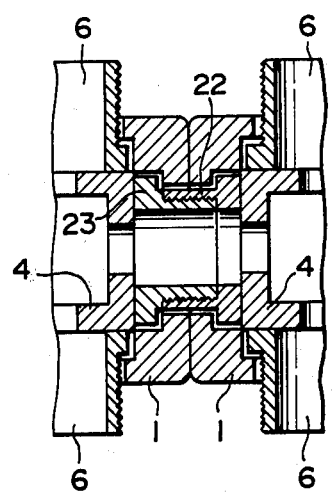

FIG. 15 is a longitudinal side section of the principal parts of the embodiment of FIG. 14.

Figure 16A:
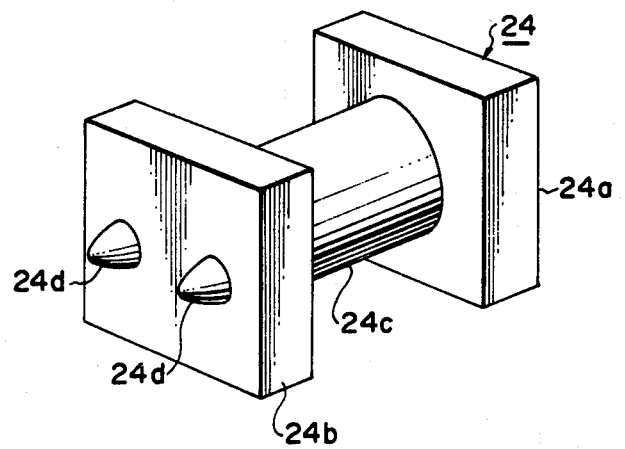

FIG. 16a is an enlarged oblique view of another embodiment of the connecting member.

Figure 16B:
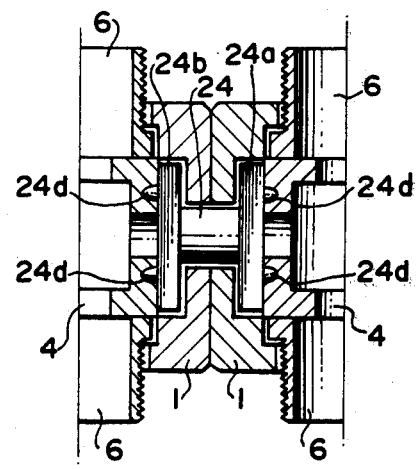

FIG. 16b is a longitudinal side section showing a working embodiment of the principal parts of FIG. 16a.

Figure 17:
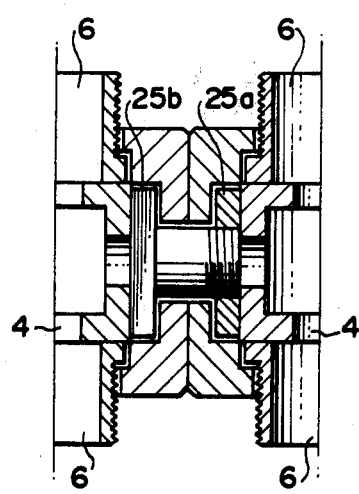

FIG. 17 is a longitudinal side section showing another embodiment of the connecting member.

Figure 18A:
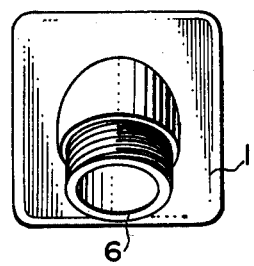
Figure 18B:
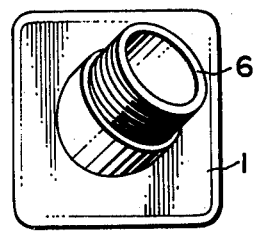

FIGS. 18a and 18b are front views of the principal parts in an inclined piping of the apparatus of the invention.

Figure 19:
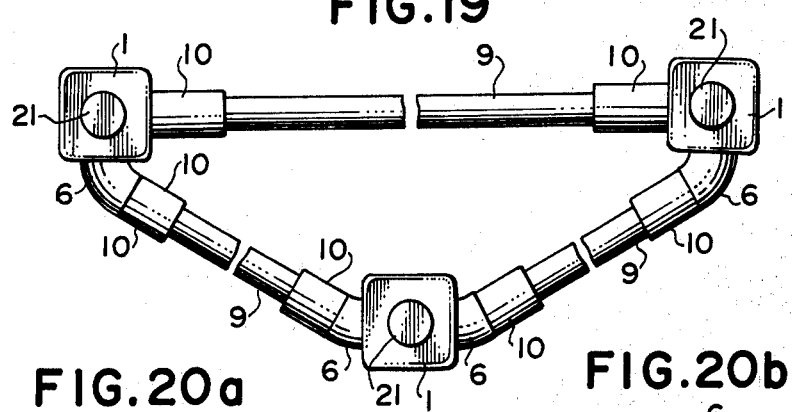

FIG. 19 is a side view showing a basic piping thereof.

Figure 20A:
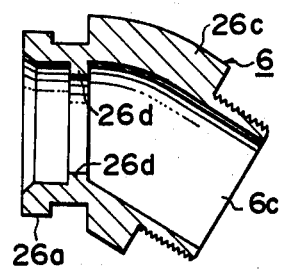
Figure 20B:
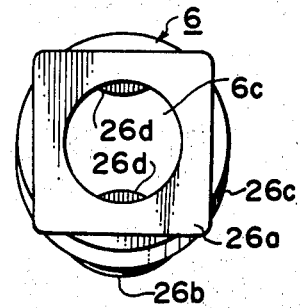
Figure 20C:
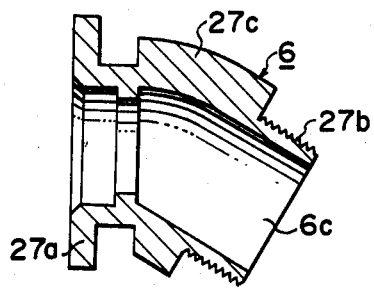
Figure 20D:
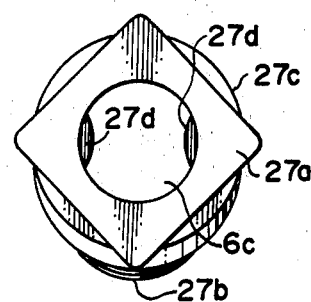

FIGS. 20a to 20d show embodiments of the principal parts in an inclined piping, FIG. 20a being a longitudinal section of the principal parts corresponding to those illustrated in FIG. 18a, FIG. 20b a left side view thereof, FIG. 20c a longitudinal section of the principal parts corresponding to those shown in FIG. 18b, and FIG. 20d a left side view thereof.

Figure 21:
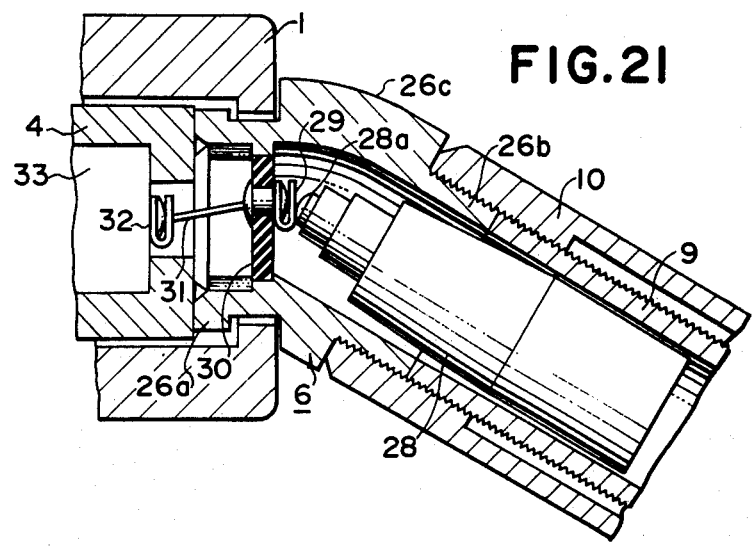

FIG. 21 a partly longitudinal side section showing a working embodiment of the principal parts illustrated in FIGS. 20a to 20d.

FIGS. 22 to 26 are partly longitudinal side sections showing working embodiments of the apparatus of the invention worked as an electrical piping.

Figure 27A:
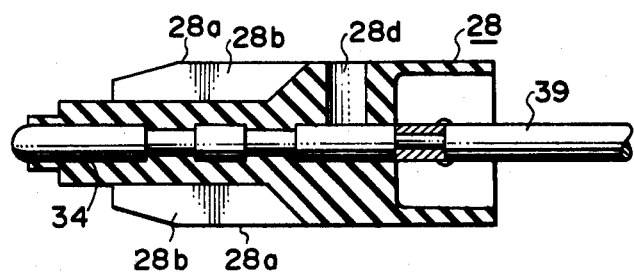
Figure 27B:
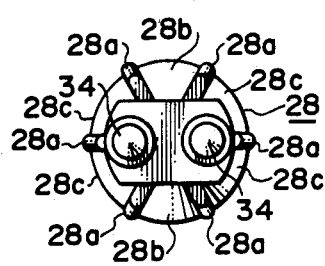
Figure 27C:
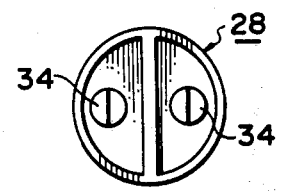
Figure 27D:
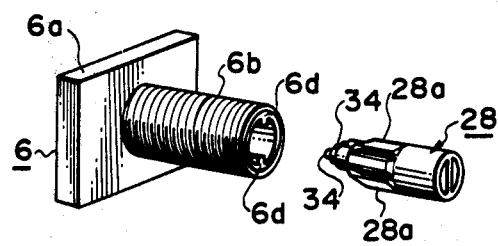
Figure 27E:
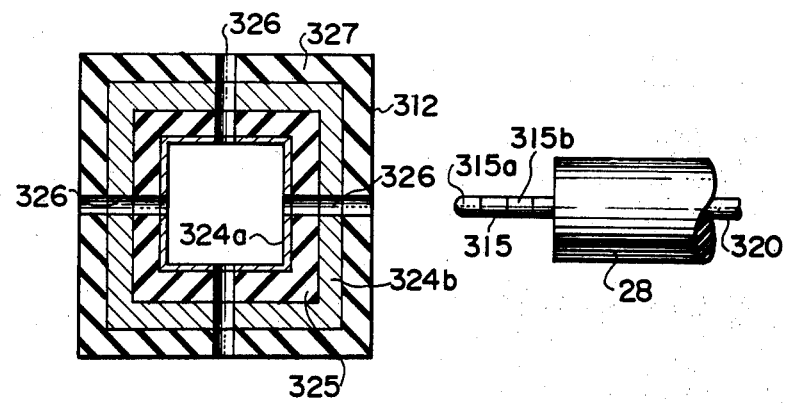
Figure 27F:
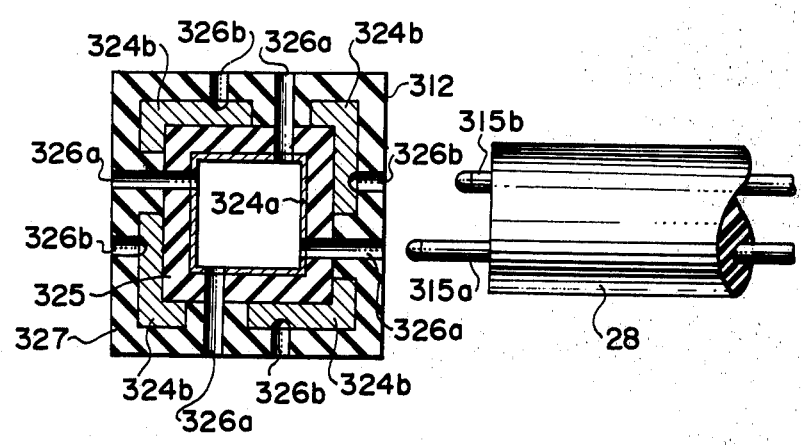

FIGS. 27a to 27f show a connecting member in the electrical piping, FIG. 27a being a partly longitudinal side section, FIG. 27b a front view, FIG. 27c a rear elevation, FIG. 27d a view explaining a working embodiment thereof, and FIG. 27e and FIG. 27f views explaining working embodiments of other connecting members.

FIGS. 28a to 28b and 29a to 29f are exploded views showing embodiments of the core member in the electrical piping.

Figure 30A:
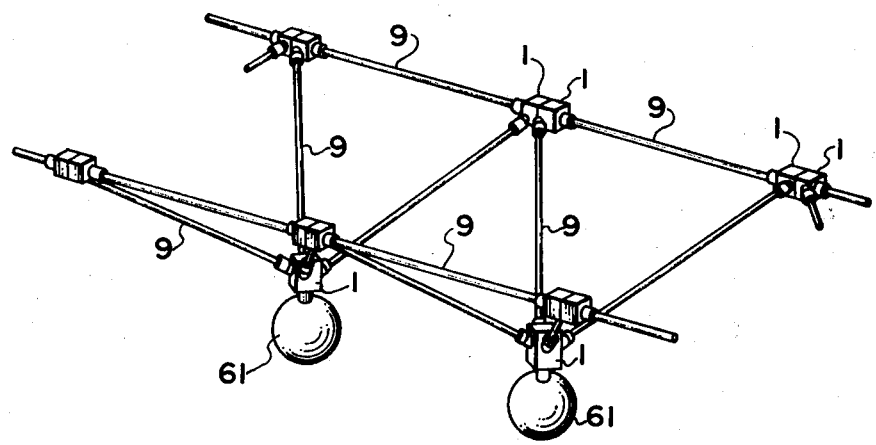
Figure 30B:
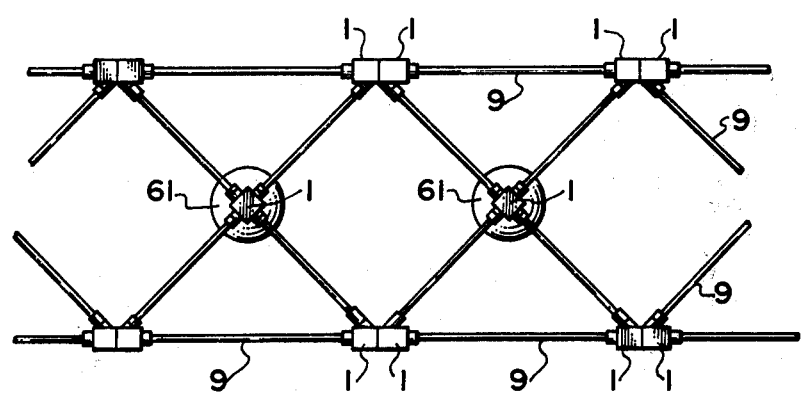
Figure 31A:
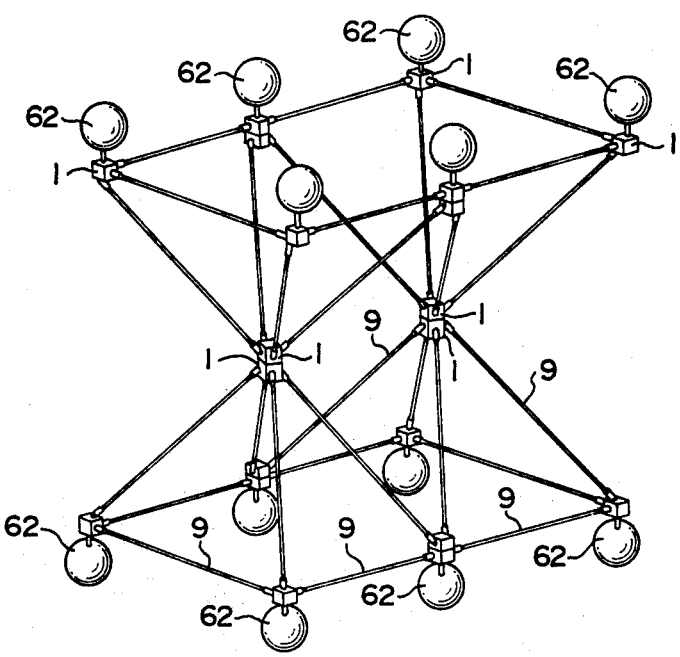
Figure 31B:
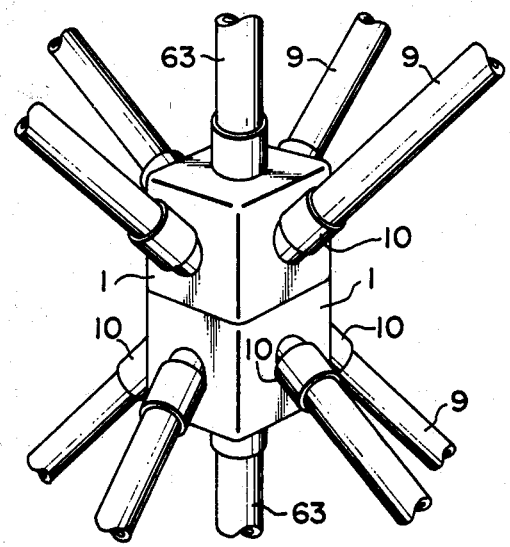
Figure 32:
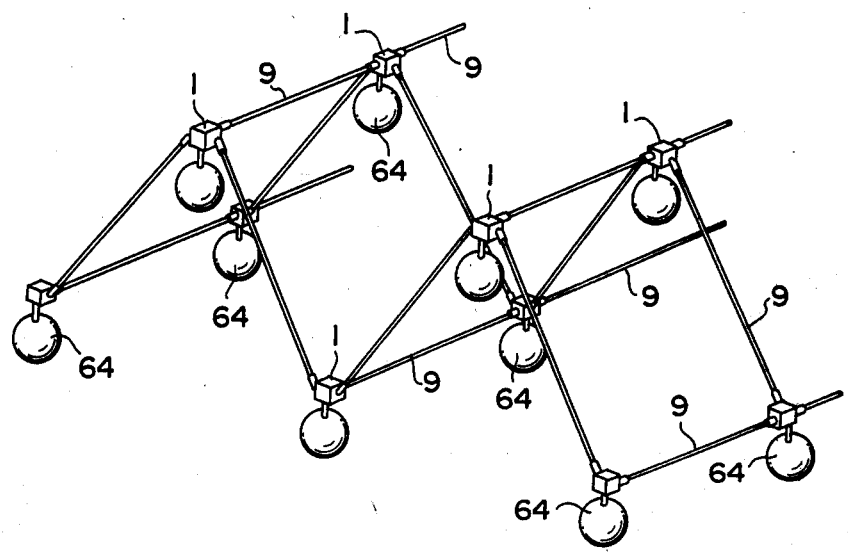
Figure 33:
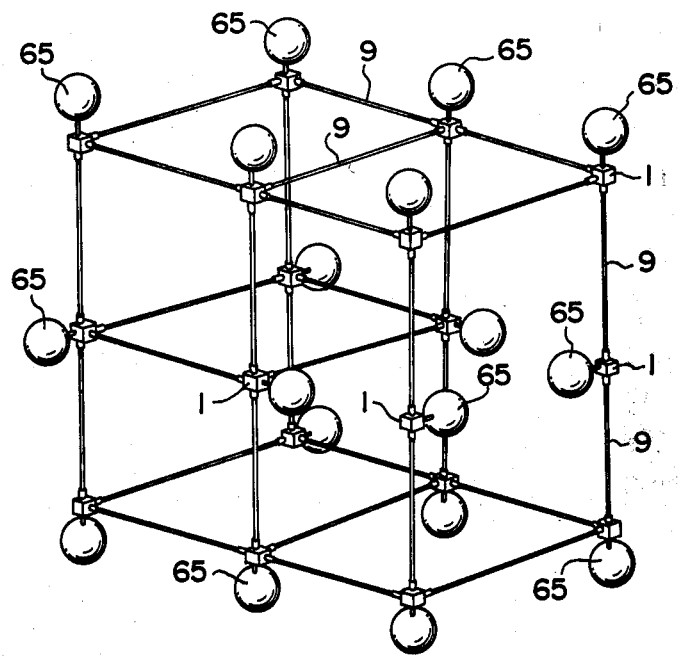
Figure 34:
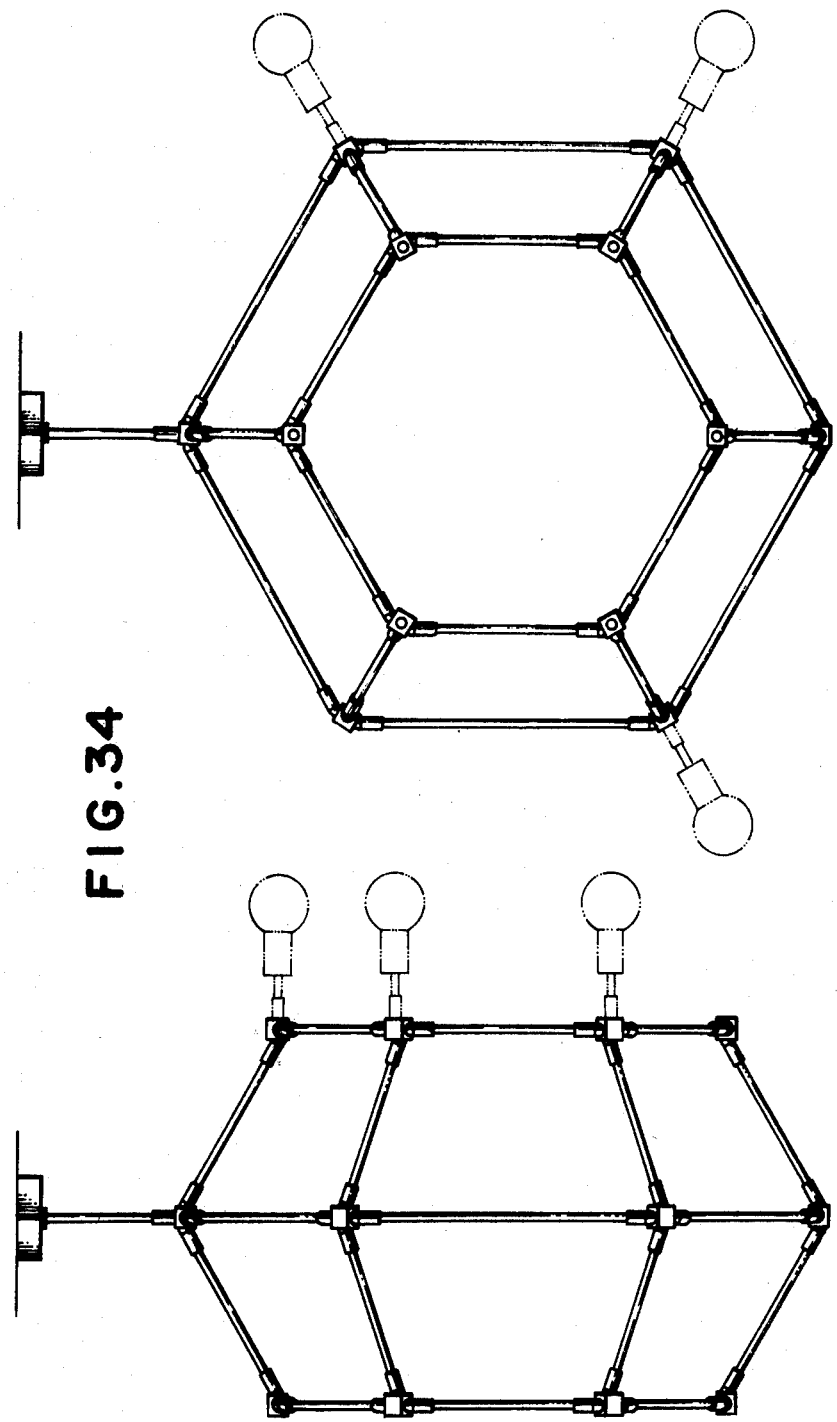

FIGS. 30a to 34 show typical working embodiments of the apparatus of the invention, FIG. 30a being a perspective view illustrating a continuous three-dimensional piping in the form of an inverted pyramid, FIG. 30b a plan view thereof, FIG. 31a a perspective view showing a continuous three-dimensional piping in the form of a sand-glass, FIG. 31b a partly enlarged perspective view thereof, FIG. 32 a perspective view showing a continuous three dimensional piping in the form of a roof, FIG. 33 a perspective view illustrating a three-dimensional piping of a shelf structure, and FIG. 34 a view showing a hexagonal construction.

Figure 1A:
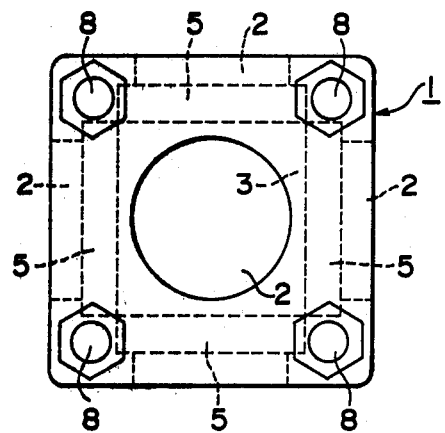
FIGS. 1a to 1c illustrate a half constructional element of the connecting body which constitutes an outer housing of the apparatus of the invention, FIG. 1a being a front view, FIG. 1b a longitudinal side section, and FIG. 1c a rear elevation.
Figure 1B:
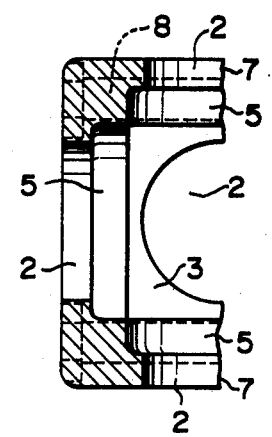
Figure 1C:
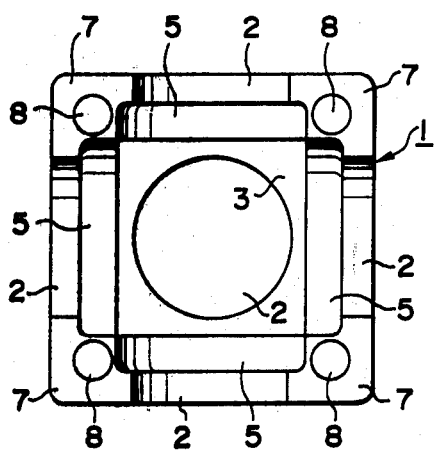

FIGS. 1a to 1c show a half constructional element of a connecting body 1 composed of a square hexahedron, FIG. 1a being a front view, FIG. 1b a longitudinal side section, and FIG. 1c a rear elevation of one half of the body.

Figure 2:
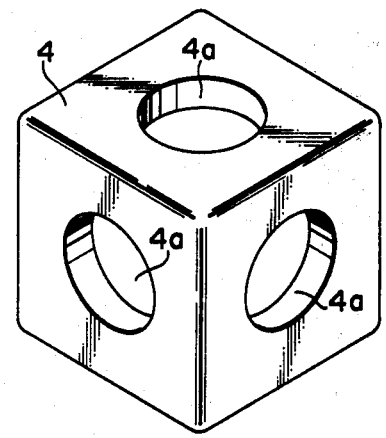
FIG. 2 is an oblique view illustrating an inner frame housed within the said connecting body.

The connecting body 1 serves as a housing for the connection of piping materials, and it is provided at the centre of each face with a through hole 2 into which a projecting pipe as a connecting end is inserted, each face constituting a connecting face to be connected with each piping member. The connecting body 1 is basically composed of two half-constructional elements as shown in the drawing, so that the connecting body 1 has six connecting sides. The connecting body 1 is provided at the central portion of its inside with a hollow portion 3 adapted to receive an inner frame 4 in the form of a cube similar to the connecting body 1. The inner frame 4 loosely supports the projecting pipe with respect to the connecting body 1, which projecting pipe serves as a connecting member employed for the connection with piping materials as hereinafter described, supporting the projecting pipe at the time of the connection thereof with piping materials, and it constitutes a fluid feed passage or an electrical wiring passage after application of the piping. For this purpose, the inner frame 4 is a hollow frame as shown in FIG. 2, having in each face thereof a through hole 4a of a generally similar configuration as that of the foregoing through hole 2 so that, when received in the connecting body 1, each face of the inner frame 4 is parallel to the corresponding side of the connecting body 1 and so that each through hole 4a is opposed to each through hole 2 of the connecting body 1. The connecting body 1 has a staged portion between the same and its through hole 2, and a concave groove 5 formed adjacent the hollow portion 3 for receiving the inner frame 4. The concave groove 5 is adapted, as shown in FIGS. 3a to 3c, to receive a base portion 6a of the projecting pipe 6 so that the projecting pipe 6 may not come off nor rotate. For constructing one connecting body 1 from the half-constructional elements illustrated in FIGS. 1a to 1c, two of the said half-constructional elements may be connected to each other so that connecting faces 7 formed at the four corners of the body, in FIG. 1c as seen correspond with each other. In the embodiment, a through hole 8 is formed in the connecting face 7 so as to be perpendicularly thereto. Through the through hole 8 is inserted a bolt, so that the connection is effected with bolt and nut. It goes without saying, however, that the two body sections may be connected by the use of a binding agent or an insert member. The through hole 2 for the projecting pipe 6 is of the shape corresponding with the section. Of the projecting pipe 6 of course, it may be in the form of various polygons, in addition to a circle. The projecting pipe 6 is, as shown in FIGS. 3a and 3b, made up of a tubular portion passing through the through hole 2 in each connecting side of the connecting body 1, and a base portion 6a in the form of a square flange, which base portion is received in the concave groove 5. The outer diameter of the tubular portion is smaller than the diameter of the through hole 2, with the base portion 6a also made smaller than the concave groove 5, so that, when the projecting pipe 6 has been attached to the connecting body 1, the projecting pipe 6 is loosely supported on the connecting body 1, whereby the projecting pipe 6 can be moved to a slight degree direction and in the radial direction. The projecting pipe 6 is provided at the periphery of its projected portion with threads 6b which are engageable with threads of piping members or coupling members to be connected therewith. Also, the projecting pipe 6 has an opening 6c which communicates, at the time of assembling, with the hole 4a of the inner frame 4. FIG. 3c illustrates another embodiment of the projecting pipe 6. The base portion 6a, which is received by the concave groove 5, is provided at its centre, with internal threads, in which is screwed a pipe 6 provided on its outer periphery with external threads. FIG. 4 illustrates a working embodiment of the projecting pipe 6 of FIG. 3c. A piping member 9 is fitted into the inside part of the projecting pipe 6 by threading means and thereafter the projecting pipe 6 may be threadedly connected to the base portion 6a. in order to add mechanical strength to the projecting pipe 6, there is proposed the embodiments of FIGS. 3d 3g.

In FIGS. 3d 3g, the peripheral threaded portion of the projecting pipe is composed of a threaded metal pipe. In FIG. 3d, the threaded metal pipe 411 is provided in a portion of its inner periphery with a retaining recess 412, in which a molded portion formed in the threaded metal pipe 411 is disposed, so that the integration between the pipe 411 and the connecting base 41 is strengthened. In case, as in the embodiment, the threaded metal pipe 411 is of a thin wall, the recess 412 is effectively provided past through up to the threaded portion; this is, however, not always required when the pipe wall is thick. In FIG. 3g, the threaded metal pipe 411 has at one end thereof a flange 412a, which is provided with notches 412b. The retaining recess 412 may be in various shapes capable of resisting forces in axial and circumferential directions acting on the threaded metal pipe 411, such as a continuous U-shaped or S-shaped configuration, not to mention circular and polygonal ones. The threaded metal pipe 411 is provided on its inner periphery with a molded portion 413 made of plastic molded integrally with the connecting base 41, the molded portion 413 occupying, as hereinbefore described, the inside of the retaining recess 412 or notches 412b of the threaded metal pipe 411. In such a condition, the molded portion 413 covers the inner wall surface of the threaded metal pipe 411, so that the electrical insulation in electrical wiring can be further assured and so that, by the provision of an axial guide protuberance on the molded portion 413, it becomes possible to exactly guide, without rotating, a connecting element coming from the side of piping material in the projecting pipe (in this case referred to as 410). In this case, of course, the connecting element (not shown) is provided with a concave guide groove engageable with the guide protuberance. The projecting pipe 410 illustrated in FIGS. 3e and 3f is of a construction particularly for electrical wiring, the inside of the pipe 410 being occupied by a solid molded portion 416 except for a hollow portion 415 at the forward end. The molded portion 416 has pairs of opposed through holes 417 as shown in the drawing, through which electrode rods (not shown) can be passed, the electrode rods contacting at one end thereof an electrode located within the connecting base 41 and facing at the other end the said hollow portion 415. In FIG. 3f, the guide holes 418 formed in the molded portions 413 and 416 in such a manner that they are vertical pairs, are for guiding the connecting elememt coming, at the time of connection, from the side of the piping material into the projecting pipe 410, the guide holes 418 being provided in a reverse relation to the foregoing guide protuberance. Within the molded portions 413 and 416 there may be provided earphone jack type terminals or terminals of three or four electrodes. In the case of the connecting pipe for fluid, the molded portion 413 is preferable in the form of a tube; if required, however, a filter may be provided. In the case of the connecting pipe of a mere shelf structure, the molded portions 413 and 416 may be made solid.

According to the instant embodiment, therefore, the peripheral threaded portion of the projecting pipe 410 is made up of the threaded metal pipe 411 integrally connected with the connecting base 41 and the molded portion 413, and so there is no danger of the threaded portion becoming worn and impossible to be connected even if it is used for a showcase of commodities and for an electrical wiring system in lighting equipment, those cases requiring a frequent detachment. Even if there is impressed, when in use, on the threaded metal pipe 411 an axial tensile force or a deflection or torsion load, the connection between the projecting pipe 410 and the piping material is maintained strong because of a strong connection of the molded portion 413 with the retaining recess or the flange and its notches of the threaded metal pipe 411. Moreover, since the inner wall surface of the threaded metal pipe is covered with the molded plastic portion, not only a perfect insulation in electrical wiring can be obtained, but also a guide portion for the connecting element can be provided.

Figure 6:
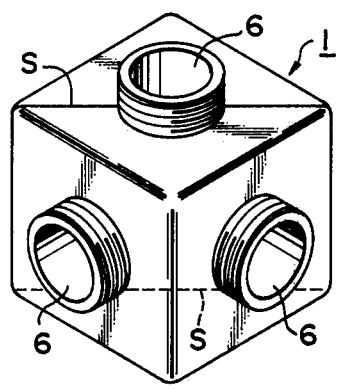

FIG. 5 shows a view of a completed pipe connecting apparatus. In this case, a projecting pipe 6 is projected, as seen in FIG. 1c, through the through hole 2 at the center of one of the half-constructional elements of the connecting body 1, then the inner frame 4 is housed in the half element, thereafter four projecting pipes 6 are projected through the holes 2 of a semi circular configuration located on four sides, and finally the sixth projecting pipe 6 is projected through the centre of the other half-constructional element, followed by connection of the two elements, to result in the pipe connecting apparatus as shown in FIG. 5. In the connecting body 1 illustrated in FIG. 5, a connection line S appears at the central portion parallel to the side line of the body. In FIG. 6, where the connecting body 1 is made up of two half constructional elements in the form of a triangle, the connection line S appears on the diagonal line. The connecting body 1 shown in FIG. 7 is composed of a vessel and a top cap thereon, in this case, the connection line S appears along a connected side. Other methods for dividing the connecting body 1 include the method in which, in the hexahedron shown in FIG. 8, the faces A, B, C, D, E and F may be separately formed and thereafter assembled in various ways, such as a combination of ABC with DEF, a combination of ABCD with EF, and that of ABD with CEF.

There is now given an explanation taken in connection with FIGS. 9a to 12 of some embodiments of pipe connecting apparatus using the construction mentioned above. In FIG. 9a, the projecting pipe 6 and piping member 9 are provided with their respective threads 6b and 9b, and over the periphery of the piping member 9 there is threadedly fitted a coupling member 10. As shown in the drawing, the projecting pipe 6 and the piping member 9 are disposed face to face with each other, then the coupling member 10 is threaded in the direction of the projecting pipe 6, and the end portion of the coupling member 10 is urged against the connecting side of the connecting body 1, whereby a firm connection between the projecting pipe 6 and the piping member is attained. In this case, even if the piping member somewhat displaces in its axial and radial positions, the projecting pipe 6 and the piping member 9 can be aligned and connected with each other by means of the coupling member 10, since the projecting pipe 6 is mounted so that there is left a clearance between the same and the through hole 2 and concave groove 5 of the connecting body 1 whereby its axial and radial positions can be moved with respect to the connecting body 1, that is, the piping member 9. Consequently, problems are now solved, such as, for example, the coupling member 10 could not heretofore be smoothly threaded over the projecting pipe 6 due to displacement in the mounting of piping member 9.

In FIG. 9b, the projecting pipe of FIGS. 3a to 3c is made so short as not to project outwardly from the connecting side of the connecting body 1 (preferably, the forward end of the projecting pipe is positioned in the same plane as the connecting side), and the projecting pipe 6 so constructed as to have a smaller outer diameter is mounted in a position concentric with the hole 2 of the connecting body 1, and the internal threads 10b formed on the end portion of the inner periphery of the coupling member 10 are threaded over the external threads 6b formed on the outer periphery of the projecting pipe 6, whereby the connection between the projecting pipe 6 and coupling member 10 is achieved, while, at the same time, the piping member 9 with one end thereof inserted inside the coupling member 10 is connected to the body 1. In this case, the piping member 9 is free to be moved axially within a fixed range relative to the coupling member 10 and therefore the apparatus of the instant embodiment is suitable for piping equipment requiring an axial expension of the piping member 9, for example, due to thermal expansion. In the case of a piping construction such that the spacing between the connecting bodies 1 positioned at both ends of the piping member 9 is maintaind constant, such as an intermediate shelf, the coupling member 10 and the projecting pipe 6 may be merely fitted with each other at the position shown in FIG. 9b and integrally fixed with some means other than that mentioned above, such as set screws. This is suitable particularly for the piping of square-shaped piping members.

FIG. 9c shows an improved type wherein a retaining tubular portion of a smaller diameter is provided on the inner wall of the free end of the coupling member 10 illustrated in FIG. 9b, while an outwardly expanding retaining end portion 9c is formed at the forward end of the piping member 9 which has been fitted in the coupling member 10 so that it can rotate about the central axis, whereby the piping member is prevented from being disengaged from the coupling member 10 whenever the piping member has been contracted.

Figure 9D:
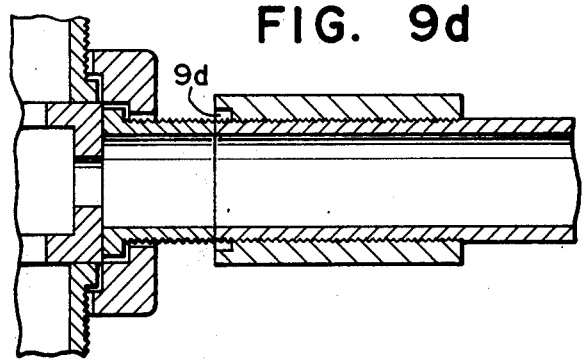

FIG. 9d shows a developed type of the embodiment of FIG. 9a. In the embodiment of FIG. 9a, the walls of the end portions of the projecting pipe 6 and of the piping member 9 have been cut askew so that the two may be fitted with each other and so that the alignment of the piping member 9 with respect to the projecting pipe 6 may be easily effected under such fitting so as to faciliatate the subsequent operation of threading on the coupling member 10. On the other hand, in the embodiment shown in FIG. 9d, the internal slot at the end of the coupling member 10 is defined and fitted over the projecting pipe 6 when the latter and the piping member 9 have been abutted against each other and the coupling member threaded over the piping member 9 has been rotated in the projecting direction, and, under such a condition under which both the pipes are prevented from slipping off each other, the engagement of the slots of the piping member 9 with the threads of the projecting pipe 6 is attained by rotating piping member 9. Due to the presence of the portion 9d, it becomes possible to smooth the fitting of the coupling member 10 with the projecting pipe 6 whenever the piping member 9 and the projecting pipe 6 are connected with each other, so that the connecting operation can be conducted with ease.

Figure 9E:
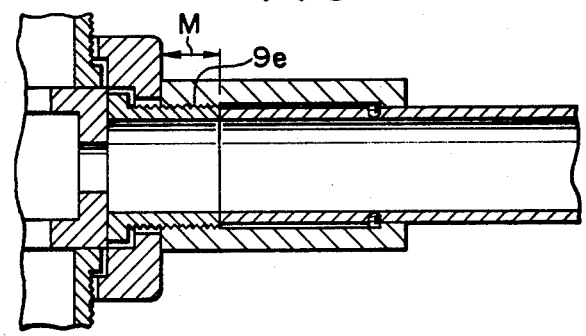

FIG. 9e shows a developed type of the embodiment of FIG. 9c. In FIG. 9e, slots 9e of the coupling member 10 are formed over a length M substantially corresponding to the projected length of the projecting pipe 6 from the connecting body 1, and the coupling member 10 is tightened so that it is urged against the outer wall of the connecting body 1 as in the embodiment illustrated in FIG. 9a.

Figure 9F:
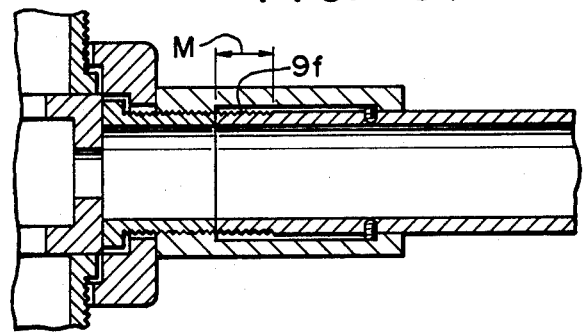
Figure 9G:
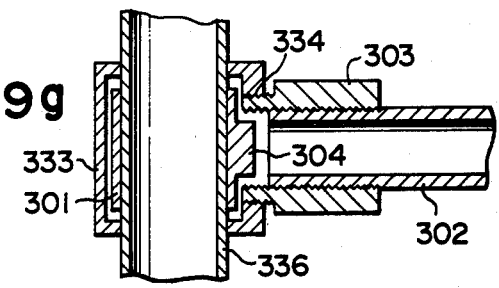

In FIG. 9f, which shows a further developed type of apparatus as in FIG. 9d, there are formed threads 9f of a length M corresponding to the foregoing length M also in the end portion of the piping member 9, in addition to the construction of the embodiment illustrated in FIG. 9d. The threads 9f are provided for purpose of bringing the coupling member 10 back to the position of the end of the piping member 9, so that the connection and disconnection of the piping member with and from the projecting pipe 6 can be effected easily and positively.

FIG. 10a shows the case in which a square-shaped piping member is connected, the projecting pipe 6 being molded also in a square shape. In one side of the coupling member 10 are formed holes 10a, 10b through which set screws 12 are inserted. The set screws 12 are screwed, past through the holes 10a, 10b, in holes 11a, 11b formed respectively in the piping member 9 and projecting pipe 6, whereby the projecting pipe 6 and the piping member 9 can be coupled together.

FIG. 10b shows an embodiment for removing, at the time the piping member is coupled, the clearance provided between the connecting body 1 and the projecting pipe 6 in the embodiment of FIG. 10a. In this case, a hole 10d is formed in the coupling member 10, through which the set screw is inserted, while a hole 11d having a counter sunk groove 11e is formed in the projecting pipe 6, so that, in the position where the set screw 12 fits in the hole 11d, the forward end of the coupling member 10 is in abutment with the connecting body 1 and at the same time the clearance between the connecting body 1 and the projecting pipe 6 is removed. On the other hand, as in the embodiment of FIG. 9c, there may be provided a retaining tubular portion 10c and a retaining end portion 9c respectively at the free end of the coupling member 10 and at the forward end of the piping member 9, so that at the time of coupling the forward end of the piping member 9 is in abutment with that of the projecting pipe 6, whereby the connecting body 1 and the piping member 9 can be closely connected together by the provision of only one set screw 12.

In the construction such that the coupling member is threaded over both the projecting pipe 6 and piping member 9 as in the embodiments of FIGS. 9a and 9d, the construction of FIG. 10c is preferable in which the set screw 12 is provided at the portion where the coupling member 10 and the piping member 9 are fitted together. According to the construction just mentioned above, the clearance between pitches, at the time the coupling member 10 is fitted over the projecting pipe 6, is removed upon abutment of the end portion of the coupling member 10 with the outer wall of the connecting body 1, while the clearance, between pitches, between the coupling member 10 and piping member 9 can be removed solely by the tightening of the set screw 12. This construction, accordingly, makes possible a more firm mounting of piping members, and thus it is most suitably used in the construction of shelves etc.

In the embodiment shown in the exploded perspective view of FIG. 10d, the projecting pipe 204 is composed of a metal ring 204a constituting its outer periphery and a molded material 204b, the metal ring 204a and molded material 204b being partly cut out. The shape of the notches varies depending on embodiments hereinafter described. In the embodiment of FIG. 10d, the projecting pipe 204 is provided with a dovetail portion 205 at a position opposite to the pipe 202 to be coupled, and with a groove 206 at the end thereof, the groove 206 allowing the insertion of an electrode piece hereinafter described. The portion of the molded material 204b corresponding to the dovetail portion 205 is so finished as to have a tapered face in the direction of its bottom.

To the pipe 202 is attached a lug 208 so shaped as to fit in the dovetail portion 205 and groove 207 of the molded material 204b, the lug 208 having at its forward end a plurality of electrode pieces 209 arranged in the direction of its length. The lug 208 is made of an insulating resin material and, as illustrated in the drawing, it is projected as a separate member from the end of the pipe 202. However, the pipe 202 may be cut out at the end thereof so that a part remains to form the lug 208 as an integral part of the pipe 202. Further, three or four electrodes may be provided as the electrode piece 209, in addition to the two electrode types shown in the drawing.

According to the construction of the embodiment illustrated in FIG. 10d, the pipe 202 is connected to the connecting body 201 by moving the pipe 202 in such a direction as to cross the direction thereof usually adopted in connecting the lug 208 and the dovetail portion 205 of the projecting pipe 204. The end of the lug 208 is so tapered as to correspond to the wedge shape of the groove 207 of the molded material 204b, so that the positioning operation for the coupling can readily be done and so that, by pushing the lug 208, the lug can be fitted extremely closely in the groove 207 and thus the operation is completed without producing any loose condition. Further, the lug 208 and groove 207 both are in the form of an inverted wedge with respect to a disengaging direction, so that they fit together extremely firm also in the disengaging direction. As a result, the projecting pipe 204 and pipe 202 are in a temporarily coupled condition with their ends being in abutment with each other without leaving any clearance, and the electrical contact between electrode pieces (not shown) disposed in a deep portion of the projecting pipe 204 and the electrode pieces 209 of the pipe 202 is good. At least one side of these electrode pieces may be so constructed as to have a spring resilience in the foregoing direction of the contact, as in the case of conventional electrical connecting ends.

After such temporary coupling, the coupling member 203 is used to attain a firm connection of the pipe 202 with the connecting body 201. In this case, there is no need for the operation for positioning and maintenance of the connecting ends of the pipe 202 and of the projecting pipe 204, so that the tightening by means of the coupling member 203 can be done with extreme ease.

Figure 10F:
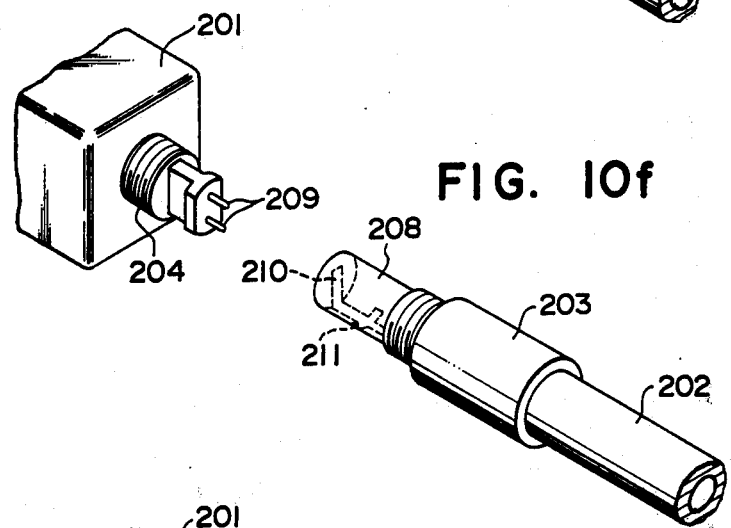
Figure 10G:
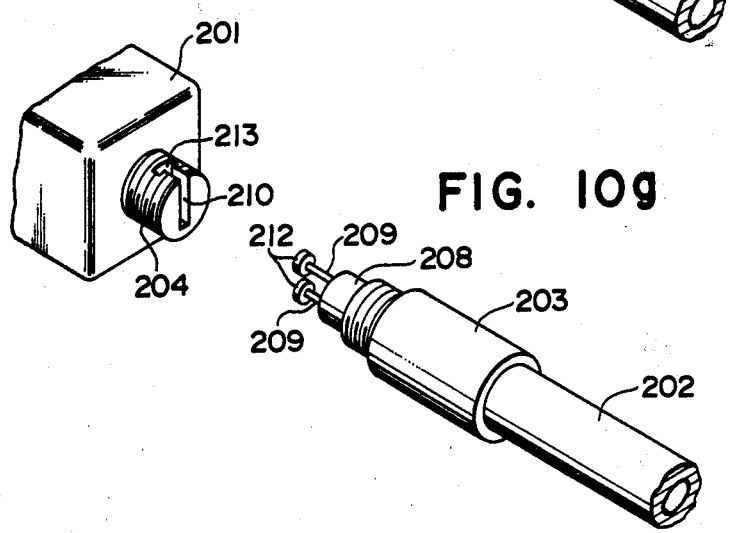

FIGS. 10e to 10g show other embodiments of the apparatus of the present invention. In FIG. 10e, the projecting pipe 204 is provided with, in lieu of the dovetail portion 205 of the embodiment illustrated in FIG. 10d, a groove 210 extending in the direction of the pipe coupling, and with a transverse groove 211 extending in a lateral direction with respect to the groove 210, while the lug 208 has been changed in shape so that it corresponds to the said grooves. According to the instant embodiment, consequently, the pipe 202 can be kept in position and prevented from disengaging by such a temporary coupling operation as described hereinbefore. The transverse groove 210 and the corresponding portion of the lug 208 may be tapered in the direction of the depth of the groove, whereby the end of the projecting pipe 204 and that of the pipe 202 can be in abutment with each other and the contact of the electrodes 209 can be made in a close manner, as in the embodiment illustrated in FIG. 10d.

FIG. 10f shows an embodiment in which the construction of the projecting member 204, pipe 202 and lug 208 has been made in an inverted manner, with the same function as that shown in the embodiment of FIG. 10e.

Also in other embodiments, including that of FIG. 10d, such an inverted arrangement of the grooves and lug may be adopted.

In the embodiment illustrated in FIG. 10g, the electrode pieces 209 at the end of the lug 208 are provided with their respective retaining ends 212, while the projecting pipe 204 has a groove 213 adapted to engage the said retaining ends 212.

Figure 10H:
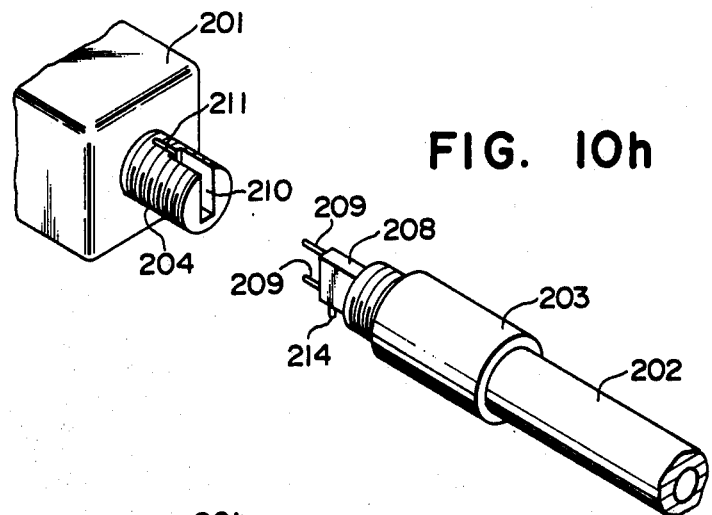

In FIG. 10h, the groove 210 for the fitting between the projecting pipe 204 and lug 208 exerts no function to prevent the pipe from disengaging in the direction of the pipe coupling, but, for the purpose of preventing the same, a pin 214 projects from the lower end of lug 208 and a corresponding hole (not shown) is formed in the bottom of groove 210. If it is not required to prevent the pipe from disengaging the provision of the pin 214 is unnecessary. It goes without saying that, in the embodiment of FIG. 10g, the lug 208 may be so constructed as to be engageable with the groove 210 as in the embodiment illustrated in FIG. 10h.

Figure 10I:
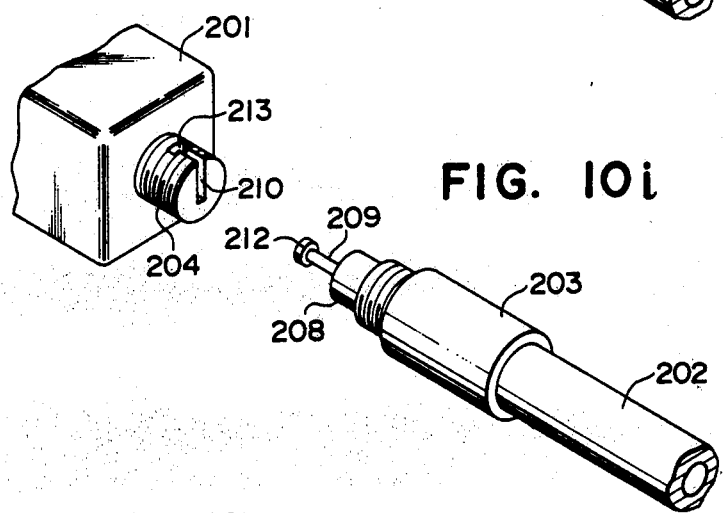

FIG. 10i shows a modification of the embodiment illustrated in FIG. 10g. The electrode pieces 209 shown in FIG. 10g are the two longitudinally disposed ones, whereas, in FIG. 10i, a jack type retaining end 212 is used. In such a type, the structure of three or four electrodes, not to mention two electrodes, may of course also be adopted.

Figure 10J:
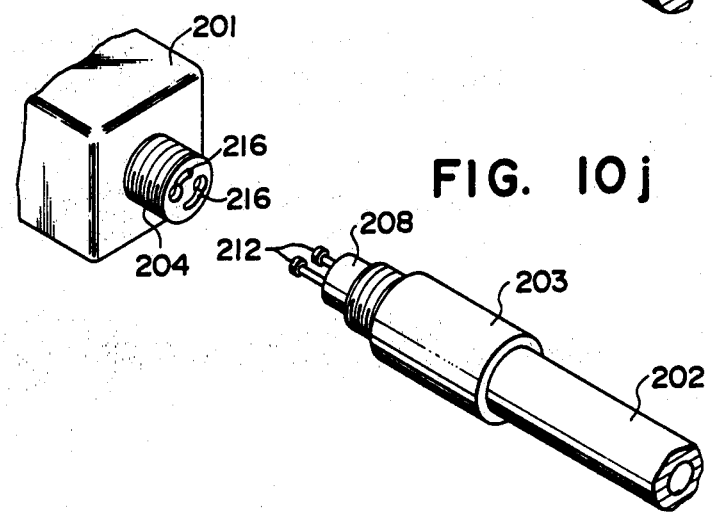

FIG. 10j shows an embodiment in which the retaining ends 212 of the electrode pieces are retained in grooves 216 formed in the projecting pipe 204 first by fitting the electrode pieces of the pipe 202 into the projecting pipe 204 in the coupling direction and then by turning the pipe 202 in a circumferential direction with respect to the said direction. As another embodiment of such a retaining means by utilization of turning, the construction of the wedge type base may be adopted, in which several pairs of claws are provided on the outer periphery of the lug 208 in a direction opposed to that for pipe coupling so that each of said pairs hold a plate in the projecting pipe 204, whereby an electrode piece located on the contact surface of the claws with the plate or in another position is contacted with an electrode plate disposed in the surface area of the plate.

FIG. 11 shows an embodiment in which, in the pipe connecting apparatus illustrated in FIG. 9a, a packing 13 is provided in the clearance between the connecting body 1 and projecting pipe 6, while a packing 14 is provided in the base portion of the projecting pipe 6, so that these packings serve to seal the clearance between the connecting body 1 and projecting pipe 6 at the time the piping member 9 is coupled to the projecting pipe 6; and thus there is provided pipe connecting apparatus suitable for the piping for fluids. In this case, even if the projecting pipe 6 moves in its axial and radial positions axis, such displacement can be tolerated by the deformation of packings 13, 14, and thus the apparatus is most suitably employed in piping equipment attended with thermal expansion and contraction.

FIG. 12 shows the most basic mode of three-dimensional piping structure, in which the details of the projecting pipe 6, and a part of the connecting body 1, are omitted. Such a three-dimensional piping structure can be utilized as a frame of a stand, a showcase, or the like. For removing a single piping member 9 from the three-dimensional piping structure, the coupling members 10 positioned at both ends of the said piping member 9 are loosened so as to be withdrawn from the position coupled with the projecting pipe 6, then the piping member 9 is released from its connection and thus can be removed alone and in a simple manner. For mounting, the end of the piping member 9 is abutted with the projecting pipe 6 of the connecting body 1 and then the coupling member 10 is fastened in the coupling position. By utilization of the pipe connecting apparatus of the present invention, it is possible, as will be apparently understood from the above, to easily remove and mount the minimum unit of a single pipe in every optional portion of the piping from and to the piping structure.

Figure 13A:
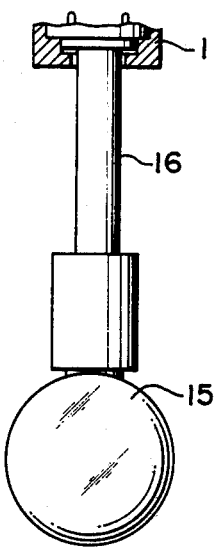
Figure 13B:
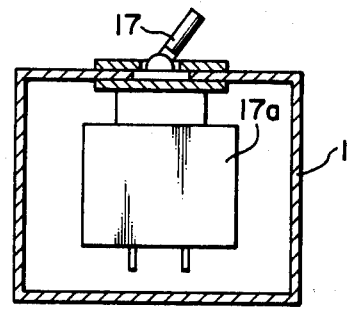

FIGS. 13a to 13h show accessories to be attached to the connecting body 1 in electrical piping. In FIG. 13a, there is provided directly in place of the projecting pipe 6 of the connecting body 1, a pipe 16 having an illumination light 15. In FIG. 13b, a toggle switch 17 is provided on the connecting body 1; in this case, if an internal portion 17a of the switch 17 is small sized, it can be contained in the inner frame 4. The switch 17, together with the projecting pipe 6, may be projected on the connecting side of the body 1.

Figure 13C:
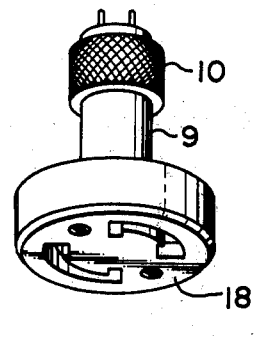
Figure 13D:
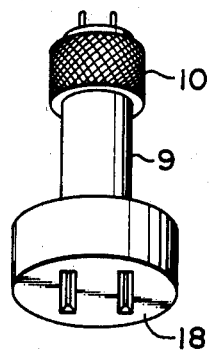

FIGS. 13c and 13d show embodiment in which the piping member 9 having a plug socket 18 is coupled to the projecting pipe 6 by means of coupling member 10, whereby the plug socket can be attached to a connecting side of the body 1.

Figure 13E:
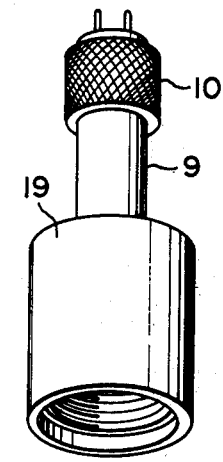

FIG. 13e shows an embodiment in which, in the same way, the piping member 9 is coupled to the projecting pipe 6 by the coupling member 10.

Figure 13F:
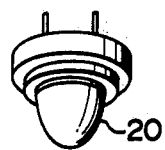

FIG. 13f shows an embodiment in which a pilot lamp 20, in lieu of the projecting pipe 6, is mounted on a connecting side of the body 1.

Figure 13G:
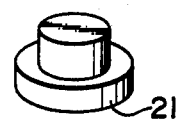

FIG. 13g shows a blind cover 21 provided for purpose of closing up the through hole 2 of the connecting body 1.

Figure 13H:
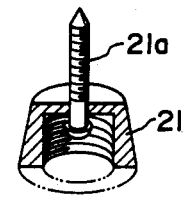

FIG. 13h shows a blind cover 21 in the form of a cap adapted to be threadedly attached to the projecting pipe 6, the top of the cover 21 being so designed as to receive a screw 21a capable of being attached directly to the ceiling or the like. With regard to the electrical connection in the connecting body 1, it will be described hereinafter.

FIGS. 14 to 17 show multiple piping of the apparatus of the invention. In FIG. 14, a plurality of connecting bodies 1 are directly combined together, so that a multiplicity of connecting sides and projecting pipes 6 are juxtaposed with one another so as to make multiple piping possible, whereby the foregoing accessories can be attached in large numbers.

FIG. 15 shows a longitudinal section of the connection between connecting bodies 1. In FIG. 15, the reference numerals 22, 23 represent connecting members with their respective base portions supported by the concave groove 5 of the connecting body 1. One of the connecting members 22, 23 is provided in the inner periphery thereof with internal threads, while the other is provided in the outer periphery thereof with external threads, the internal and external threads being engaged each other whereby the connecting bodies 1 are connected together in an integral manner.

FIG. 16a shows another connecting member 24, which is provided at both ends thereof with base portions 24a, 24b adapted to fit in the concave grooves 5 of the bodies 1 to be connected. The base portions 24a, 24b are integrally connected together in advance through a connecting portion 24c. In those connecting bodies whose connection line S is at the central portion of the body 1 as shown in FIGS. 5 and 14, the connecting member 24 is fitted in one of the connecting bodies 1 while the latter are still in the form of half-constructional elements, and thereafter the half constructional elements are coupled together. As can be seen the connecting member 24 illustrated in FIG. 16a is advantageously employable in such a case as just mentioned above.

FIG. 16b is a longitudinal section showing the condition in which the connecting member 24 has been used electrically in practice. The connecting member 24 can be used in general applications if there is provided a connecting hole passing through the base portions 24a, 24b and connecting portion 24c. The reference numeral 24d represents an electrical terminal.

In FIG. 17, a nut-like connecting member 25a is provided in one concave groove 5 of the connecting body 1 to be connected, in which is threadedly fitted a connecting member 25b substantially of the same construction as that of the projecting pipe 6, so that the connection between connecting bodies 1 is attained.

FIGS. 18a and 18b are schematic illustrations showing the inclined direction of the projecting pipe 6 with respect to the connecting body 1 in the case where inclined piping is adopted using the pipe connecting apparatus of the invention. Inclination of the projecting pipe 6 aims at achieving such an inclined piping as generally shown in FIG. 19.

FIGS. 20a to 20d exemplify the projecting pipes 6 to be used in inclined piping. The projecting pipe 6 illustrated in FIGS. 20a and 20b corresponds to that shown in FIG. 18a. The projecting pipe 6 is provided with a square-shaped base portion 26a to be fitted in the concave groove 5 of the connecting body 1, and with a curved portion 26c curving in the direction of one square-shaped edge of the base portion 26a, so that the forward end 26b of the projecting pipe 6 is inclined in the piping direction.

On the other hand, the projecting pipe 6 illustrated in FIGS. 20c and 20d corresponds to that shown in FIG. 18b. A curved portion 27c curves in a diagonal direction of a square-shaped base portion 27a to be fitted in the concave groove 5 of the connecting body 1. The forward end 27b of the projecting pipe 6 is different in the inclining direction from the end 26b of FIGS. 20a and 20b by an angle of 45°. With regard to the inclining direction of the projecting pipe 6, there are illustrated only two examples, but it goes without saying that the inclination in various directions is possible and that the angle of inclination against the connecting side of the body 1 can vary. The numerals 26d, 27d represent protuberances formed with a view to holding connecting terminals or the like in the inner wall of the communicating hole 6c.

FIG. 21 shows an embodiment of the foregoing inclined piping. To the end 26c of the inclined projecting pipe 6 is opposed the piping member 9 in an inclined condition, both being integrally coupled together by means of the coupling member 10. The numeral 28 is an insulating electrical connecting member projecting from inside of the piping member 9 into the projecting pipe as the coupling member 10 is tightened. In the construction shown, a terminal 28a of the connecting member is in abutment with a contact 29 located in the projecting pipe 6. The numeral 30 is an insulating supporting member for supporting the contact 29, which supporting member is mounted in the projecting pipe 6. The numeral 31 is a lead wire connecting a terminal 32 located in the inner frame 4 with the contact 29. With regard to the relation between coupling member 10 and connecting member 28, it will be described in detail hereinafter.

FIGS. 22 to 25 show applications of the pipe connecting apparatus of the invention to electrical piping. The inner frame 4 contains in its inside a core member provided with an electrical contact corresponding to each projecting pipe 6. Upon coupling of the piping member 9 with the projecting pipe 6 through the coupling member 10, the connecting member 28 contained in the piping member 9 advances, so that the connecting terminal 34 contacts the insulating core member 33.

Figure 22:
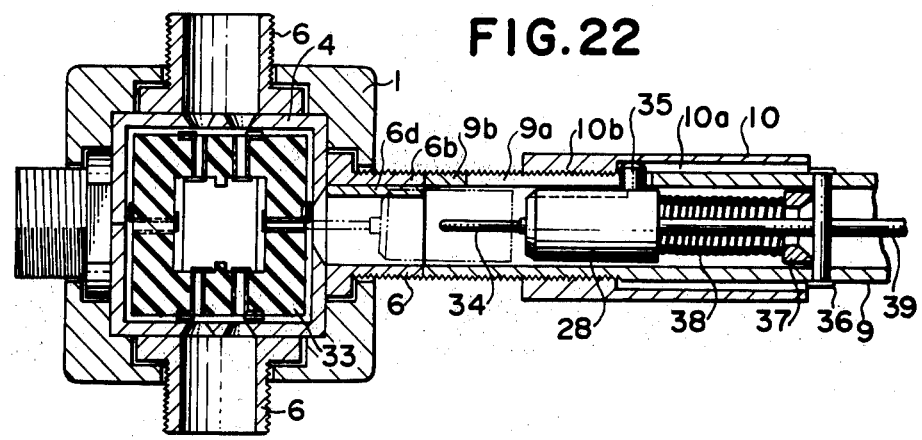

In FIG. 22, threads 6b are formed on the outer periphery of the projecting pipe 6, while threads 9b are formed on the outer periphery of the forward end of the piping member 9. On the other hand, the coupling member 10 is provided on its inner peripheral wall with threads 10b engageable with the threads 6b, 9b, and it is fitted over the piping member 9. Also, the coupling member 10 has a stepped portion so that there is formed an inner cylindrical portion 10a having an expanded inner diameter. In the threads 9b of the piping member 9 there is provided an axially extending long hole 9a, through which a pin 35 mounted in the connecting member 28 passes so that it occupies its position within the inner cylindrical portion 10a of the coupling member 10. The connecting member 28 is biased in the projecting direction by means of a compression spring 38 provided so that the spring has a compressive force between the rear end of the connecting member 28 and a fixed piece 37 which is in abutment with a fixed pin located in a rear portion of the piping member 9, so that the pin 35 is always in abutment with the stepped portion between the inner cylindrical portion 10a and threads 10b of the coupling member 10, whereby the connecting member 28 moves in the axial direction in accordance with the movement of the coupling member 10. In this case, if the fixed piece 37 is fastened to the outer periphery of the piping member 9, the fixed pin 36 is not necessary. The numeral 39 is a lead wire connected to the connecting member 28, and it is contained in the piping member 9 so that it can expand and contract in accordance with the movement of the connecting member 28. In such a construction, when the coupling member 10 is threadedly advanced in the direction of the projecting pipe 6, the connecting member 28 advances without turning and when the coupling member 10 has completely been tightened over the projecting pipe 6, the terminal 34 is in contact with the core member 33. On the contrary, when the coupling member 10 has been returned to its original position, the connecting member 28 also goes back to its original position within the piping member 9 so that the piping material can be easily removed with the connecting terminal 34 not projecting out of the end portion of the piping member 9. The numeral 6d is a guiding projection provided on the inner wall of the projecting pipe 6 (see FIG. 3b) and adapted to engage a groove formed in the outer periphery of the connecting member 28 so as to prevent the connecting member 28 from inclining or turning within the projecting pipe 6 and to prevent the occurrence of accidents such as spark and insufficient contact.

Figure 23:
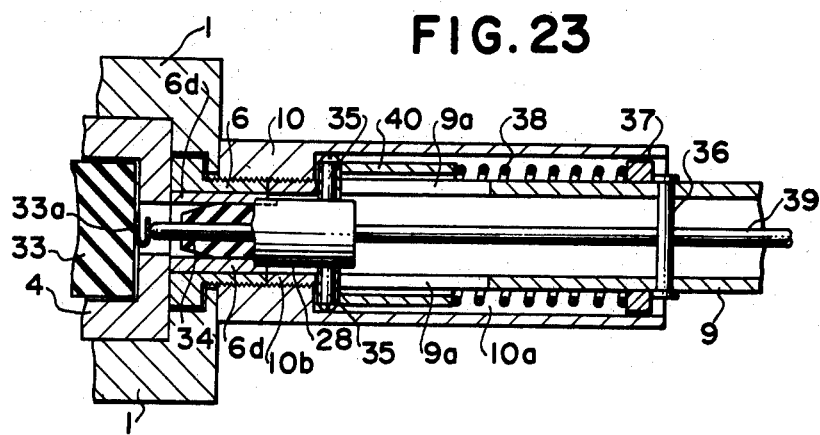

The embodiment shown in FIG. 23 is of the construction such that, in the embodiment of FIG. 22, the fixed piece 37 and compression spring 38 are disposed on the outer periphery of the piping member 9 and within the inner cylindrical portion 10a of the coupling member 10 so as to provide a compression force through collar 40 against pins 35 located in two places. Other constructions and operations are entirely identical with those of the embodiment of FIG. 22.

Figure 24:
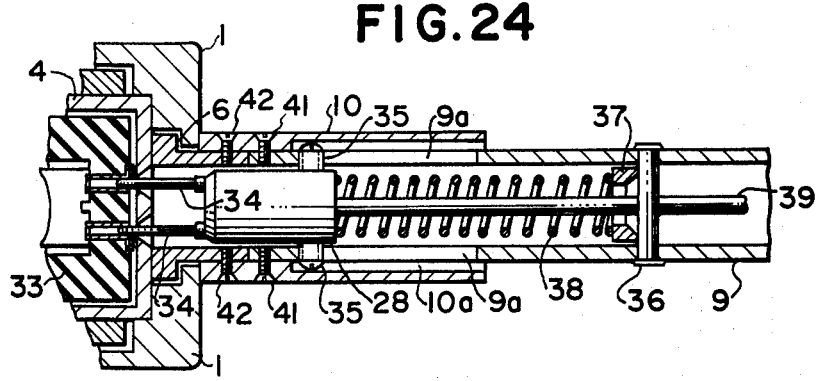

The embodiment of FIG. 24 is of the same construction and operation as those of the foregoing embodiments with the exception that the projecting pipe 6, piping member 9 and coupling member 10 are connected together in an integral manner by means of fixing screws 41, 42. Such a construction is conveniently adopted when the projecting pipe 6, piping member 9 and coupling member 10 are of a square-shaped section, because the coupling member 10 is not required to be threaded.

Figure 25:
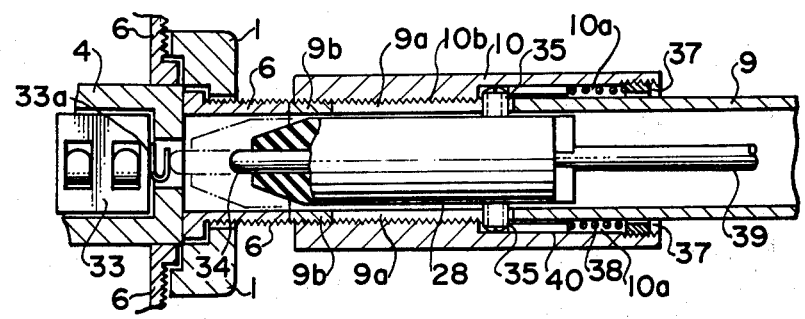

The embodiment of FIG. 25 is of the construction such that, in the apparatus shown in FIG. 23, the fixed piece 37 for the compression spring 38 is fastened to the inner wall of the inner cylindrical portion 10a of the coupling member 10. Unlike the foregoing embodiments, accordingly, the fixed piece 37 moves integrally with the coupling member 10, so that the compression force of the spring 38 is maintained constant. As a result, it becomes possible, at the time of the coupling of piping member 9 with the projecting tube 6, to closely contact the terminal 34 with the contact 33a of the core member 33 with a sufficient compressive force.

If, in FIGS. 23 and 25, the collar 40 is fixed like the fixed piece 37, integrally to the inner wall of the inner cylindrical portion 10a of the coupling member 10, the connecting member 28 can move without turning in accordance with the axial movement of the coupling member 10, and thus the contact of the terminal 34 with the contact 33a of the core member 33 is assured. In this case, the distance between the terminal 34 and the contact 33a of the core member is a little shorter than that between the forward end of the coupling member 10 and the connecting side of the connecting body 1, and the contact pressure between terminal 34 and contact 33a is maintained by the resilience of the latter. It goes without saying that, in the embodiment of inclined piping shown in FIG. 21, the relation between coupling member 10 and connecting member 28 may be of the same construction as that illustrated in FIGS. 22 to 25. If, like the contact 29 in the inclined piping, the contact of the core member 33 illustrated in FIGS. 22 to 25 is so disposed as to project into the projecting pipe 6, the distance required for the connecting member 28 in the piping member 9 to move into the projecting pipe 6 can be shortened, and at the same time the distance of movement of the coupling member 10 can also be shortened.

Figure 26:
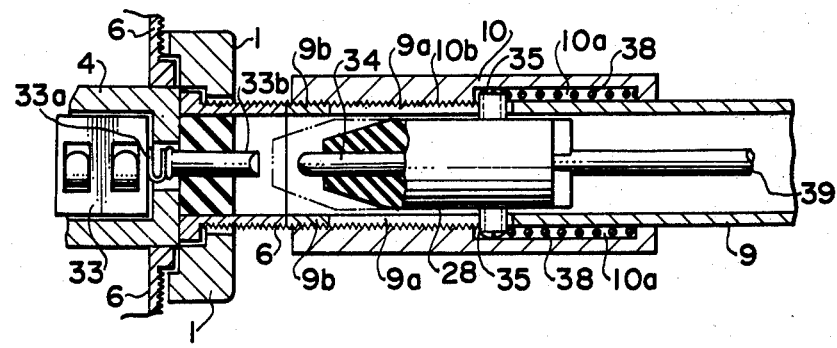

FIG. 26 shows the pipe connecting apparatus of the type such that, in FIGS. 21 to 25, the projecting distance of the connecting member 28 from the piping member 9 at the same time of coupling is made shorter in comparison with the working distance of the coupling member 10, so that, upon fitting the coupling member 10 over the projecting pipe 6, the terminal 34 of the connecting member 28 positively contacts the contact 33a and when, on the contrary, the coupling member has been removed from the projecting pipe 6, the terminal 34 of the connecting member 28 is completely withdrawn into the piping machine 9, that is, upon attachment or detachment of the coupling member 10 to or from the projecting pipe 6, contact or disengagement of the connecting member 28 with or from the contact 33 is positively completed. More particularly, an electrically conductive rod 33b is provided in the projecting pipe 6 by means of a molding method or the like so that the inner end of the rod 33b contacts the contact 33a while the outer end in the form of a concave groove contacts the terminal 34. In this case, the rod 33b is preferably axially movable so that the contact 33a, rod 33b and terminal 34 may be closely contacted each other due to the compressive force of the spring 38. The provision of the outer end of the electrically conductive rod 33b has the same effect as that obtained by projecting the contact 33a substantially up to the position where the contact 33a is in the same plane as the projected end of the projecting pipe 6, so that the operating distance required for coupling and discoupling the coupling member 10 with and from the projecting pipe 6 can be substantially reduced and so that the connecting member 28 can be prevented from being damaged at the time of the operation for coupling and disconnecting the piping member 9. Other members can be of the same construction as that in the foregoing embodiments.

FIGS. 27a to 27c show an embodiment of the above-mentioned connecting member 28. FIG. 27a is a partial longitudinal side section, FIG. 27b a front view thereof, and FIG. 27c a rear view thereof. As shown, the connecting member 28 is provided with two terminals 34 disposed therethrough, each of which has a rear end portion with which is connected a lead wire 39 shown at the right hand side in FIG. 27a by means of welding, or the like. At the portion where the connecting member 28 fits in the projecting pipe 6 there are provided a plurality of guide pieces 28a in a longitudinal direction. Between the adjacent guide pieces 28a are formed guide grooves 28b, 28c. The numeral 28d is a hole through which the pin 35 is mounted. There is now given an explanation on the basis of FIG. 27d of the outline of a working embodiment of the connecting member 28. If the connecting member 28 is fitted in the projecting pipe 6 so that the guide grooves 28b engage the guiding projections 6d on the side of the projecting pipe 6, the connecting member 28 can be prevented from turning due to the engagement of the projections 6d with the guide grooves 28b and thus moves in a rectilinear direction, whereby the contact between the terminal 34 and contact 33a can be attained in a proper manner. It goes without saying that only one guide groove 28b may be formed to engage the single projection 6d of the projecting pipe 6 as illustrated in FIG. 22. As shown in FIG. 27b, moreover, the guide pieces 28a are so designed as to contact the inner wall of the projecting pipe 6, whereby the friction area between the connecting member 28 and projecting pipe 6 can be reduced and thus a smooth movement of the connecting member 28 can be achieved. On the other hand, if in FIG. 27d the threads 6b of the projecting pipe 6 are constructed by means of a metal tube and other constructional elements, including the projections 6d are molded using synthetic resins or the like, the threads 6b engaging the coupling member 10 can be reinforced and the occurrence of an electric arc between the terminal 34 and the inner wall of the projecting pipe 6 can be prevented. In the embodiments hereinbefore described the coupling member 10 is located outside the piping member 9, but it goes without saying that the coupling member 10 may be provided within the piping member 9 and that, by means of conventional methods, the coupling and disconnection between the projecting pipe 6 and piping member 9 and the contact and disconnection between the connecting member 28 and contact 33a may be effected. The engagement of the guide grooves 28b and the guiding projections 6d can be made both in the direction shown in FIG. 27d and also in the inversed form. However, if desired, either of the guide grooves 28b may be constructed with a different configuration with the corresponding configuration of the guiding projection 6d in order to assure only a single insertion direction.

FIGS. 28a and 28b exemplify an exploded core member 33 contained directly in the connecting body 1 or in the inner frame 4 in the pipe connecting apparatus for electric piping. The core member 33 shown in FIG. 28a corresponds to the core members illustrated in FIGS. 21, 23 and 25, and it is made up of two elements 33a and 33b, which are connected with each other together with contacts 45(+) and 46(−) by means of two pin members 43 and 44 passing through holes 41a, and 41b and 42a, and 42b respectively. Also, in a direction perpendicularly intersecting the pin members 43, 44 are provided contacts 51(−) and 52(+) kept in position by pin members 49, 50 passing through slots 47, 48 respectively. The contacts 45(+) to be connected together through means of the pin member 43 are connected to a single plus connecting band 53(+) wound about the core member. Plus contacts 55(+) can be provided on the plus connecting band 53(+) in the plane parallel to the pin member 43. On the other hand, the contacts 46(−) to be connected together through means of the pin member 44 are connected to a single minus connecting band 54(−) wound about the core member. Minus contacts 56(−) can be provided in the plane parallel to the pin member 44. The plus connecting band 53(+) and contact 52(+) are connected to each other through a bent plus connecting band 57(+), while the minus connecting band 54(−) and contact 51(−) are connected to each other through a bent minus connecting band 58(−). As can be seen, if the contacts of the core member 33 are moved in a parallel direction along the plane where they are connected, they lead to the same poles, whereby the terminals of the connecting member 28 can be prevented from being connected inversely in plus and minus, and besides, the area of the core member under allowable current and voltage can be made as small as possible.

The core member 33 shown in FIG. 28b corresponds to the core members 33 illustrated in FIGS. 22 and 24. It is provided at the center thereof with a hollow portion to prevent short circuiting. Each contact on each connecting side is connected either through a plus connecting band 59(+) or through a minus connecting band 60(+), so that, if, like the embodiment shown in FIG. 26, the contacts are moved in a parallel direction along the connecting side, they lead to the same poles. It goes without saying that the core member 33 itself is made of an electrically insulating material.

Figure 29A:
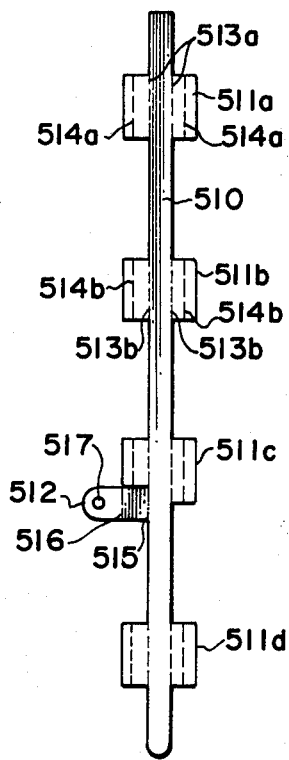
Figure 29B:
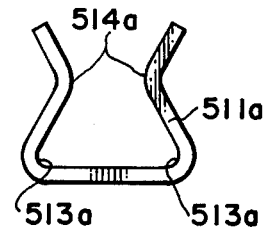
Figure 29C:
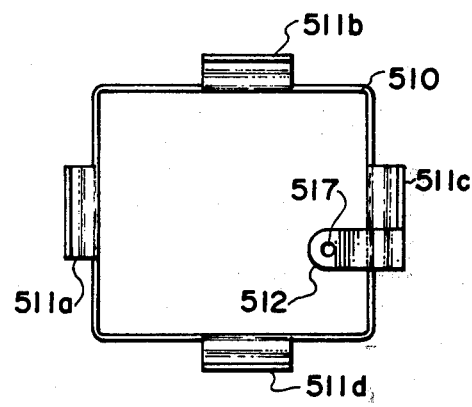
Figure 29D:
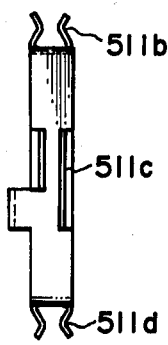
Figure 29E:
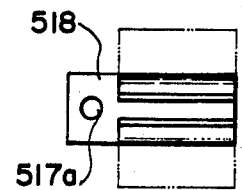
Figure 29F:
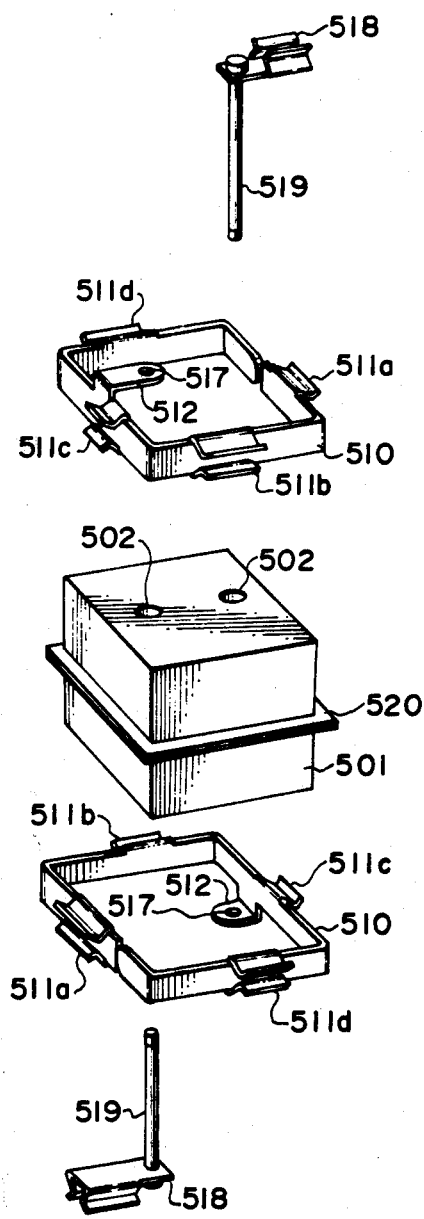

There is now provided a detailed explanation of FIGS. 29a to 29f taken in connection with the embodiment illustrated. The numeral 510 is a lead plate for disposing contact pieces having the same electrode on a cube shaped core member 501 (FIG. 29f). With two sets of the said lead plates 510, there is formed the cube-shaped core member having contact pieces of two electrodes on the sides thereof.

FIGS. 29a to 29f further show another embodiment of the core member. FIG. 29a is a development of the lead plate 510, one of the parts constituting the core member. On the sides of the lead plate 510 are integrally molded four contacts 511a, 511b, 511c and 511d spaced with fixed intervals in the longitudinal direction. Further, the lead plate 510 is provided with a fixing contact piece 512. The lead plate 510 has been cut out of a roll material so that the longitudinal direction of the lead plate makes an angle of about 45° against the direction of the roll texture. The contact pieces 511a, 511b, 511c, 511d are bent first inwardly at an angle of about 120° and then expanded outwardly at an angle of about 60° along the positions virtually illustrated as bending lines 513a, 513b, 513c, 513d and 514a, 514b, 514c, 514d, so that the contact pieces stand up on the lead plate 510 (See FIG. 29b). On the other hand, the lead plate 510 is bent at positions between contact pieces so that it eventually forms a frame having a square-shaped side as illustrated in FIGS. 29c and 29d. The fixing contact piece 512 is bent at an angle of about 90° at the position of a virtual bending line 515 along the side of lead plate 510 so that it is adjacent the square-shaped frame constituted by the lead plate 510. The forward end of the fixing contact piece 512 is further bent at an angle of about 90° along a hypothetical bending line 516. The fixing contact piece 512 is provided with a hole 517 through which is passed an eyelet member for attaching the lead plate 510 to the core member.

FIG. 29e shows a contact piece 518 having a hole 517a corresponding with the hole 517 and the same contact piece 512. The contact piece 518 is used in combination with the fixing contact piece 512. The foregoing lead plate 510 may be formed by successively bending the lead plate in a developed condition shown in FIG. 29a into the condition ready for mounting as shown in FIG. 29c. It is a matter of course, however, that it may be molded directly into the condition shown in FIG. 29c by means of drawing.

For mounting the lead plate 510 of the construction mentioned above on the core member 501, two sets of the lead plates 510 are mounted, as shown in FIG. 29f, on the core member 501 from top and bottom directions of the latter member so that the holes 517 of the fixing contact pieces 512 are opposed to two holes past through the core member 501. Then, the lead plates 510 are fastened to the core member 501 by means of pin members 519 passing through the holes 502 of the core member 501. The pin member 519 is made of an electrically conductive material. The foregoing independent contact pieces 518 are positioned respectively beneath the fixing contact piece 512 and at the other end opposed thereto.

According to the instant embodiment, it is possible to arrange two-electrode contact pieces on each connecting side of the core member. The core member 501 shown in the drawing is composed of two separate members, but it is a matter of course that it may be constructed with a single integrally formed member. Also, the lead plate 510 shown in the drawing is of the configuration adopted in the case where the core member 501 is in the form of a cube, but various modifications may of course be applied, depending on the configuration of the core member 501. It is also possible to provide a projection 520 on each connecting side of the core member with a view to separating the two electrodes to enhance the insulation between them.

Under such construction of the instant embodiment, it is possible for the contact pieces 511, 512 to put therebetween the terminal 34 projected from the piping member (see FIG. 23) and the forward end of the electrically conductive rod 33b disposed between the contact pieces 511, 512 and terminal 34 (see FIG. 26), so that a sufficient electrical contact pressure is assured between them. In addition, even in the case where such a bent projecting pipe as shown in FIGS. 20a and 20b are used and an electrically conductive bent rod is placed in the projecting pipe for the relay of the electric circuit and thus the contact position between the rod and contact piece is required to be changed, a sufficient contact pressure is assured, because the portion of the contact pieces 511, 512 where the foregoing terminal or rod is disposed therebetween is in the form of a long band and because, even when the rod contacts the face of the contact piece at a relatively loose angle, the contact pieces 511, 512 can put the forward end of the rod therebetween in a sufficient manner.

FIGS. 30a to 34 show typical preferable embodiments of the apparatus of the invention. FIGS. 30a and 30b illustrate a continuous inverted-pyramid type three-dimensional piping, with illumination lights 61 attached to the connecting bodies forming the top of the inverted-pyramid type.

FIG. 31a shows a sand-glass type three-dimensional piping, in which illumination lights 62 are attached to the connecting bodies positioned at the upper and lower sides. In this case, the three-dimensional piping structure can be supported by attaching a support such as hanger to the connecting bodies 1 positioned at the lower side. It may also be supported by the provision of a supporting pipe 63 in the central position of the upper and lower faces of the connecting body 1 as seen in FIG. 31b.

FIG. 32 shows the piping of a continuous roof-shaped structure, in which a downwardly depending illumination light 64 is attached to each connecting body 1. In this case, too, the entire structure can be supported by the provision of hangers or the like attached to the top of the connecting bodies 1.

FIG. 33 shows a three-dimensional piping of a shelf structure, in which an illumination light 65 is disposed at a suitable position on each connecting body 1 for illumination of the products on the shelf. In this case, a switch mechanism may be attached to a suitable connecting body 1 so as to freely effect flashing of the illumination light 65. As will be apparent from the explanation given above, the embodiments shown in FIGS. 28a to 31 are not limited to a three-dimensional piping structure for illumination, they can be applied as they are, for example, to a water sprinkling piping for use in farms, or to a water discharge piping for fire extinguishing.

Similarly, FIG. 34 shows another embodiment of hexagonal construction.

As hereinbefore described, the object of the invention can be attained by the pipe connecting apparatus of the invention.

Pipe 202 of FIGS. 10d to 10j is shown as a solid bar in the drawings, but it should be understood as a pipe in which internal wiring may be inserted.

FIG. 27e shows an embodiment of one plug and jack type connection and FIG. 27f of a two terminal type connection.

In FIG. 27e, the terminal 315 has conductors 315a and 315b to be connected respectively to 324a and 324b of metal materials. In FIG. 27f, leading ends of terminals 315a and 315b are connected respectively to conductors (of metal) 324a and 324b. Also shown are insulating frames 312, 325, 326 and 326a as well as apertures 326b and 327.

While the invention has heretofore been described mainly for the type wherein projecting pipes and connecting body are formed separately, it should be understood that the projecting pipes and connecting bodies may be integrally formed. For example, in FIGS. 3a and 3c, the base portion 6a can be a portion of the connecting body and in FIG. 3g flange 412a may be directly molded within the connecting body. Namely these constructions do not depart from the scope of this invention.

What I claim is:

1. An electrical pipe connecting apparatus of a multiple structure adapted to contain electrical wiring for illumination facilities therein, comprising:
    a. a hollow outer frame member of a polyhedral structure including at least two mating elements and serving as a branch base of the multiple piping, each face of the polyhedral structure having an opening defined therein;
    b. a plurality of projecting pipes, having flanges formed thereon, extending from the interior of the outer frame and through said openings to the exterior of said outer frame;
    c. an insulative core member, including electrical contacts fixedly mounted thereon, having a polyhedral configuration corresponding to that of said outer frame member and disposed within said outer frame member so as to simultaneously maintain said projecting pipes within said outer frame member by said flanges which are interposed between said core member and the interior walls of said outer frame member;
    d. communication pipes, coupled with said projecting pipes, within which electrical conductors are provided so as to be connected to said electrical contacts of said core member; and
    e. sleeves for coupling and fixing said projecting pipes to said communication pipes.

2. An electrical pipe connecting apparatus according to claim 1, wherein:
    each of said projecting pipes is movably supported in its axial direction by means of said polyhedral outer frame and said core member.

3. An electrical pipe connecting apparatus according to claim 2, wherein:
    said core member includes conductive bands mounted thereon.

4. An electrical pipe connecting apparatus according to claim 3, wherein:
    said core member consists of two half elements and further includes pins and eyelets as said electrical contacts.

5. An electrical pipe connecting apparatus according to claim 3, wherein:
    said conductive bands and said electrical contacts are provided in an integral member.

6. An electrical pipe connecting apparatus according to claim 2, wherein:
    each of said projecting pipes has an electrical conductor therewithin, so that conductors of each of said communication pipes and said core member are thereby connected when said communication pipes and said projecting pipes are attached.

7. An electrical pipe connecting apparatus according to claim 6, wherein:
    at one end of each of said communication pipes there is provided at least one electrode to be connected to said conductor of each of said projecting pipes.

8. An electrical pipe connecting apparatus according to claim 2, wherein:
    each of said projecting pipes is a hollow pipe through which a plug mounted at a forward end of each of said communication pipes and a jack provided in said core member are connected.

9. An electrical pipe connecting apparatus according to claim 2, wherein:
    at a connecting end of each of said communication pipes there is provided at least one electrode, which is spring biased in the connection direction of each of said communication pipes and said projecting pipes.

10. An electrical pipe connecting apparatus according to claim 9, wherein:
    each of said communication pipes is relatively short in length and has at its other end a socket.

11. An electrical pipe connecting apparatus according to claim 2, wherein:
    said outer frame member contains an inner frame, of approximately the same configuration as that thereof, which is interposed between said outer frame member and said core member.

12. An electrical pipe connecting apparatus according to claim 6, wherein:
    each of said projecting pipes and said communication pipes are attached in a crosswise direction with respect to the coupling direction thereof; and
    said sleeves are fixed thereover.

* * * * *